United States Patent
Sibert

(10) Patent No.: US 10,360,411 B2
(45) Date of Patent: *Jul. 23, 2019

(54) SECURE PROCESSING UNIT SYSTEMS AND METHODS

(71) Applicant: Intertrust Technologies Corporation, Sunnyvale, CA (US)

(72) Inventor: W. Olin Sibert, Lexington, MA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 15/386,666

(22) Filed: Dec. 21, 2016

(65) Prior Publication Data

US 2017/0103233 A1    Apr. 13, 2017

Related U.S. Application Data

(63) Continuation of application No. 13/874,184, filed on Apr. 30, 2013, now Pat. No. 9,536,111, which is a
(Continued)

(51) Int. Cl.
*G06F 21/71* (2013.01)
*G06F 21/86* (2013.01)
(Continued)

(52) U.S. Cl.
CPC ............ *G06F 21/71* (2013.01); *G06F 12/145* (2013.01); *G06F 21/6218* (2013.01);
(Continued)

(58) Field of Classification Search
CPC ...................................................... G06F 21/71
See application file for complete search history.

(56) References Cited

U.S. PATENT DOCUMENTS

| 4,827,508 A | 5/1989 | Shear |
| 5,457,748 A | 10/1995 | Bergum et al. |

(Continued)

FOREIGN PATENT DOCUMENTS

| EP | 0 715 247 A1 | 6/1996 |
| WO | WO 97/43761 A2 | 11/1997 |

(Continued)

OTHER PUBLICATIONS

Jaggar, Dave, *Advanced RISC Machines (ARM) Architecture Referenced Manual.* Prentice Hall, 1997. ISBN 0-13736-299-4 (paperback).

(Continued)

*Primary Examiner* — Kambiz Zand
*Assistant Examiner* — Thanh H Le
(74) *Attorney, Agent, or Firm* — Finnegan, Henderson, Farabow, Garrett & Dunner, LLP

(57) ABSTRACT

A hardware Secure Processing Unit (SPU) is described that can perform both security functions and other information appliance functions using the same set of hardware resources. Because the additional hardware required to support security functions is a relatively small fraction of the overall device hardware, this type of SPU can be competitive with ordinary non-secure CPUs or microcontrollers that perform the same functions. A set of minimal initialization and management hardware and software is added to, e.g., a standard CPU/microcontroller. The additional hardware and/ or software creates an SPU environment and performs the functions needed to virtualize the SPU's hardware resources so that they can be shared between security functions and other functions performed by the same CPU.

5 Claims, 20 Drawing Sheets

Related U.S. Application Data continuation of application No. 13/070,379, filed on Mar. 23, 2011, now abandoned, which is a continuation of application No. 12/194,465, filed on Aug. 19, 2008, now Pat. No. 7,930,360, which is a continuation of application No. 11/528,752, filed on Sep. 27, 2006, now Pat. No. 7,430,585, which is a continuation of application No. 09/643,630, filed on Aug. 21, 2000, now Pat. No. 7,124,170.

(60) Provisional application No. 60/150,126, filed on Aug. 20, 1999.

(51) Int. Cl.
  *G06F 12/14* (2006.01)
  *G06F 21/62* (2013.01)
  *G06Q 50/18* (2012.01)
  *H04L 29/06* (2006.01)

(52) U.S. Cl.
  CPC .......... *G06F 21/6227* (2013.01); *G06F 21/86* (2013.01); *G06Q 50/188* (2013.01); *H04L 63/0823* (2013.01); *H04L 63/126* (2013.01); *G06F 12/1491* (2013.01); *G06F 2212/1044* (2013.01)

(56) References Cited

U.S. PATENT DOCUMENTS

| | | | |
|---|---|---|---|
| 5,530,235 | A | 6/1996 | Stefik et al. |
| 5,534,975 | A | 7/1996 | Stefik et al. |
| 5,629,980 | A | 5/1997 | Stefik et al. |
| 5,634,012 | A | 5/1997 | Stefik et al. |
| 5,638,443 | A | 6/1997 | Stefik et al. |
| 5,715,403 | A | 2/1998 | Stefik |
| 5,892,900 | A | 4/1999 | Ginter et al. |
| 5,920,861 | A | 7/1999 | Hall et al. |
| 5,943,422 | A | 8/1999 | Van Wie et al. |
| 5,982,891 | A | 11/1999 | Ginter et al. |
| 6,112,181 | A | 8/2000 | Shear et al. |
| 6,125,430 | A | 9/2000 | Noel et al. |
| 6,157,721 | A | 12/2000 | Shear et al. |
| 6,185,683 | B1 | 2/2001 | Ginter et al. |
| 6,220,510 | B1 | 4/2001 | Everett et al. |
| 6,292,569 | B1 | 9/2001 | Shear et al. |
| 6,427,140 | B1 | 7/2002 | Ginter et al. |
| 6,567,974 | B1 | 5/2003 | Czajkowski |
| 7,124,170 | B1 | 10/2006 | Sibert |
| 7,243,236 | B1 | 7/2007 | Sibert |
| 7,430,585 | B2 | 9/2008 | Sibert |
| 7,930,360 | B2* | 4/2011 | Sibert .................... G06F 12/145 709/216 |
| 2011/0173409 | A1* | 7/2011 | Sibert .................... G06F 12/145 711/163 |
| 2013/0247231 | A1* | 9/2013 | Sibert .................... G06F 12/145 726/34 |

FOREIGN PATENT DOCUMENTS

| | | |
|---|---|---|
| WO | WO 98/10381 A1 | 3/1998 |
| WO | WO 01/10076 A2 | 2/2001 |

OTHER PUBLICATIONS

Menezes A.J., et al., *Handbook of Applied Cryptography*, CRC Press, Oct. 1996. ISBN 0-8493-8523-7 (hardcover).

Patterson, D., et al. *Computer Architecture: A Quantitative Approach*, 2nd ed. Morgan Kaufmann, ISBN 1-55860-372-7 (paperback), 1996.

Patterson D., et al., *Computer Organization and Design: The Hardware/Software Interface*, 2d ed., Morgan Kaufmann, ISBN 1-55860-428-6 (hardcover), Aug. 1997.

Pugh, E.W., et al., *IBM's 360 and Early 370 Systems*, MIT Press, ISBN 0-262-16123-0 (hardcover), Mar. 1991.

Schneier, B., *Applied Cryptography*, 2d ed., John Wiley & Sons, ISBN 0471117099 (paperback), Oct. 1995.

Sibert Olin, et al., "DigiBox: A Self-Protecting Container for Information Commerce," Proceedings of the First USENIX Workshop on Electronic Commerce, New York, NY, Jul. 1995, 9 pages.

Sibert Olin, et al., "Securing the Content, Not the Wire, for Information Commerce," InterTrust Technologies Corporation, 1996, 12 pages.

Stefik, M., "Chapter 7: Classification, *Introduction to Knowledge Systems*," Morgan Kaufmann Publishers, Inc., 1995, pp. 543-607.

Stefik, M., "Letting Loose the Light: Igniting Commerce in Electronic Publication," Xerox PARC, Palo Alto, CA, 1994-1995, 35 pages.

Stefik, M., "Letting Loose the Light: Igniting Commerce in Electronic Publication," *Internet Dreams: archetypes, myths, and metaphors*, Massachusetts Institute of Technology, 1996, pp. 219-253.

Stefik, "Trusted Systems," Scientific American, Mar. 1997, pp. 78-81.

Office Action dated Apr. 8, 2004 for U.S. Appl. No. 09/643,630, filed Aug. 21, 2000.

Office communication dated Feb. 24, 2005 for U.S. Appl. No. 09/643,630, filed Aug. 21, 2000.

Final Office Action dated Jun. 16, 2005 for U.S. Appl. No. 09/643,630, filed Aug. 21, 2000.

Office Action dated Feb. 27, 2006 for U.S. Appl. No. 09/643,630, filed Aug. 21, 2000.

Notice of Allowance dated Aug. 21, 2006 for U.S. Appl. No. 09/643,630, filed Aug. 21, 2000.

Office Action dated Sep. 25, 2007 for U.S. Appl. No. 11/528,752, filed Sep. 27, 2006.

Office Action dated Apr. 1, 2008 for U.S. Appl. No. 11/528,752, filed Sep. 27, 2006.

Notice of Allowance dated Aug. 7, 2008 for U.S Appl. No. 11/528,752, filed Sep. 27, 2006.

Office Action dated May 27, 2010 for U.S. Appl. No. 12/194,465, filed Aug. 19, 2008.

Notice of Allowance dated Dec. 10, 2010 for U.S. Appl. No. 12/194,465, filed Aug. 19, 2008.

Office Action dated Apr. 25, 2012 for U.S. Appl. No. 13/070,379, filed Mar. 23, 2011.

Office Action dated Oct. 31, 2012 for U.S. Appl. No. 13/070,379, filed Mar. 23, 2011.

Office Action dated Jun. 14, 2013 for U.S. Appl. No. 13/070,379, filed Mar. 23, 2011.

Office Action dated Jul. 3, 2014 for U.S. Appl. No. 13/874,184, filed Apr. 30, 2013.

Office Action dated Feb. 2, 2015 for U.S. Appl. No. 13/874,184, filed Apr. 30, 2013.

Office Action dated Oct. 9, 2015 for U.S. Appl. No. 13/874,184, filed Apr. 30, 2013.

Office Action dated Apr. 14, 2016 for U.S. Appl. No. 13/874,184, filed Apr. 30, 2013.

Notice of Allowance dated Aug. 29, 2016 for U.S. Appl. No. 13/874,184, filed Apr. 30, 2013.

\* cited by examiner

MONITOR SOFTWARE LOAD PROCESS (2)

ALTERNATE LOAD PROCESS (1)

ALTERNATE LOAD PROCESS (2)

SECURE PROCESSING UNIT SYSTEMS AND METHODS

RELATED APPLICATIONS

This application is a continuation of U.S. application Ser. No. 13/874,184, filed Apr. 30, 2013, which is a continuation of U.S. application Ser. No. 13/070,379, filed Mar. 23, 2011 (now abandoned), which is a continuation of U.S. application Ser. No. 12/194,465, filed Aug. 19, 2008, which issued as U.S. Pat. No. 7,930,360, which is a continuation of U.S. application Ser. No. 11/528,752, filed Sep. 27, 2006, which issued as U.S. Pat. No. 7,430,585, which is a continuation of U.S. application Ser. No. 09/643,630, filed Aug. 21, 2000, which issued as U.S. Pat. No. 7,124,170, which claims the benefit of U.S. Provisional Application No. 60/150,126, entitled "Secure Processing Unit Systems and Methods," filed Aug. 20, 1999, all of which are hereby incorporated by reference in their entireties.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to systems and methods for information and data processing. More specifically, the present invention relates to systems and methods for creating and operating a secure processing unit and/or a secure processing environment.

BACKGROUND OF THE INVENTION

To create a computing system (e.g., an information appliance) with a high degree of security, the core computations, and particularly those concerned with security, privacy, information integrity, financial transactions, and the like, need to be performed in a strongly tamper-resistant environment, such as the Secure Processing Unit ("SPU") described in U.S. Pat. No. 5,892,900, entitled "Systems and Methods for Secure Transaction Management and Electronic Rights Protection," issued on Apr. 6, 1999 ("the '900 patent"). In general, such an environment can be provided if the processing hardware and some internal memory is inside a physically tamper-resistant barrier, and contains software to manage internal functions appropriately.

For such tamper-resistant environments to be commercially practical, however, they should impose minimal additional cost beyond the cost of a similar, but non-secure, computing environment. Thus, for example, a problem with some conventional SPU designs is that the SPU is implemented as a separate chip, to be included in an information appliance along with the information appliance's general-purpose microcontroller. Recently, single-chip microcontrollers containing a processor, memory management unit, peripheral functions, control registers, and a significant amount of internal memory have become widely available. What is needed are systems and methods for efficiently enhancing the functionality of these components to implement an integrated secure processing unit.

SUMMARY OF THE INVENTION

Systems and methods for efficiently enhancing conventional microcontroller/micro-processor designs to enable the creation of integrated, improved SPUs are described herein. The techniques described herein are low in cost, and represent a relatively small number of gates relative to the overall device. They are also non-intrusive to the overall device architecture and implementation, in that they do not require major changes to critical timing and/or data paths in the device. Unlike earlier SPU designs, which implement the SPU as an entirely separate coprocessor distinct from the main CPU/microcontroller, or which impose expensive alterations to existing device architecture and design, this invention enables creation of an SPU at small additional cost in either manufacturing or runtime performance. It should be appreciated that the present invention can be implemented in numerous ways, including as a process, an apparatus, a system, a device, a method, a computer readable medium, or as a combination thereof. Several inventive embodiments of the present invention are described below.

In one embodiment, a hardware Secure Processing Unit (SPU) is described that can perform both security functions and other information appliance functions using the same set of hardware resources. Because the additional hardware required to support security functions is a relatively small fraction of the overall device hardware, this type of SPU can be competitive with ordinary non-secure CPUs or microcontrollers that perform the same functions. A set of minimal initialization and management hardware and software are added to a base CPU/microcontroller to create an SPU environment and the functions needed to virtualize the SPU's hardware resources so that they can be shared between security functions and other functions performed by the same CPU/microcontroller.

In another embodiment, a secure processing unit is described. The secure processing unit includes an internal memory unit, a processor, logic for detecting attempts to tamper with the secure processing unit and for responding thereto, an interface to external systems or components, one or more buses for connecting the aforementioned elements of the secure processing unit, and a tamper-resistant housing. The internal memory unit may include secure random access memory, secure non-volatile memory, and secure read-only memory. The secure non-volatile memory may be powered by a battery and may include one or more cryptographic keys. In one embodiment, the internal memory unit includes a unique identifier for the secure processing unit, a private cryptographic key, a public cryptographic key, and a cryptographic certificate linking the unique identifier and the public cryptographic key. The processor may include a memory management unit and one or more processor security registers. The processor security registers may contain access control data for restricting access to certain memory regions to predefined software components and/or processor modes. The secure processing unit may also include a level-one page table. Entries in the level-one page table correspond to a level-two page table. The level-one page table entries contain an attribute that indicates whether the entries in the corresponding level-two page table may designate certain memory regions. Level-two page tables that are not allowed to designate certain regions of memory may be stored outside of the secure processing unit in external memory.

In yet another embodiment, an information appliance is described. The information appliance can be a television set-top box, a portable audio player, a portable video player, a cellular telephone, a personal computer, a workstation, or any other suitable device. In a preferred embodiment, the information appliance includes a memory unit, a secure processing unit, and a bus for connecting the memory unit to the secure processing unit. The secure processing unit includes tamper resistant packaging, logic for detecting tampering and responding thereto, a secure memory unit, and a processing unit that includes a memory management unit and one or more processor security registers. The secure processing unit is operable to perform both secure processing operations and the processing operations performed by a conventional information appliance processing unit. Thus, the secure processing unit can be used to replace an information appliance's conventional processing unit in whole or in part.

These and other features and advantages of the present invention will be presented in more detail in the following detailed description and the accompanying figures that illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. In addition, while numerous specific details are set forth in the following description in order to provide a thorough understanding of the present invention, the present invention may be practiced according to the claims without some or all of these details. For example, while the discussion of several embodiments provides the size of various memory regions, registers, signals, and the like, one of ordinary skill in the art will appreciate that these illustrative sizes can be varied without departing from the principles of the present invention. Similarly, for the purpose of clarity, certain technical material that is known in the art has not been described in detail in order to avoid obscuring the present invention. For example, reference will be made to a number of terms and concepts that are well known in the fields of computer architecture and cryptography. Background information on computer architecture can be found, for example, in Hennessy et al., *Computer Architecture: A Quantitative Approach,* 2d ed. (Morgan Kaufmann 1996); Patterson et al., Computer Organization and Design: The Hardware/Software Interface, 2d ed. (Morgan Kaufmann 1997); and Jaggar, *Advanced RISC Machines Architecture Reference Manual* (Prentice Hall 1997). Background information on cryptography can be found, for example, in Menezes et al., *Handbook of Applied Cryptography* (CRC Press 1996); and Schneier, *Applied Cryptography,* 2d ed. (John Wiley & Sons 1995). Background on Virtual Machine (VM) operating systems can be found, for example, in Pugh et al., *IBM's* 360 *and Early* 370 *Systems* (MIT Press 1991).

Figure 1A:
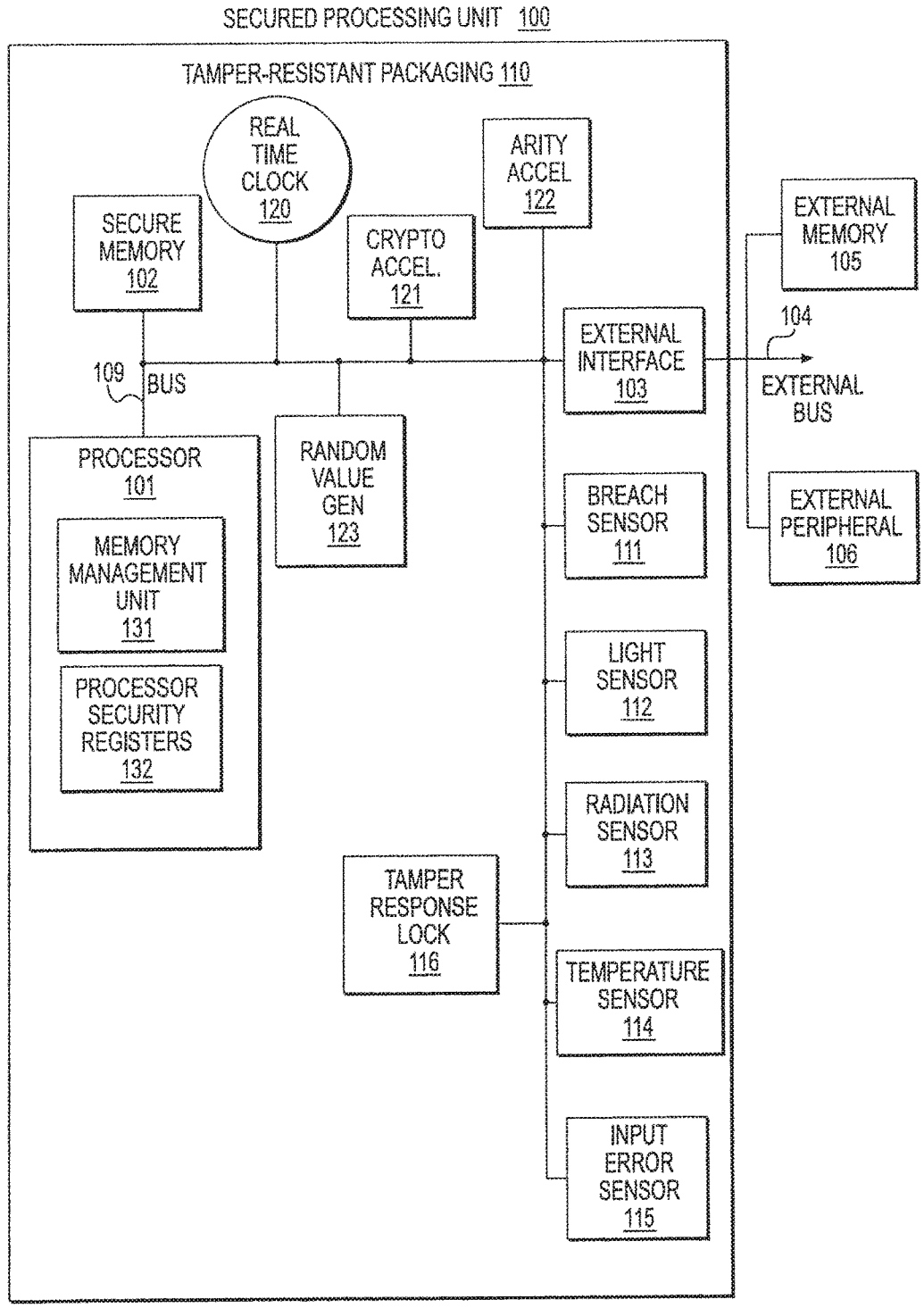
FIG. 1A illustrates a Secure Processing Unit (SPU) in accordance with an embodiment of the present invention.

As shown in FIG. 1A, in one embodiment of the present invention a Secure Processing Unit (SPU) 100 includes a processor 101, secure internal memory 102, and secure external interface 103, all operating within the protection of a physical tamper-resistant package 110, and connected together by internal data/address/control bus 109. Processor 101 may also include memory management unit 131 and processor security registers 132 to enable protection and isolation among software components running on SPU 100.

Secure internal memory 102 may be alterable but non-volatile (in whole or in part), based on technologies such as EEPROM, flash memory, ferroelectric memory, or battery-backed conventional memory technology. Although only one bus 109 is shown in FIG. 1A, one of ordinary skill in the art will appreciate that multiple internal buses may be used instead, possibly to connect together subsets of SPU components for considerations of speed, power dissipation, power distribution, isolation, or other design goals.

Secure external interface 103 may allow access to external bus 104, external memory 105, or external peripherals 106, depending on the structure of the system of which SPU 100 is a component. Also, external bus 104 may be structured as one or more physical buses that provide connections of different types, speeds, or other characteristics to different subsets of the external resources.

In addition, SPU 100 may include peripherals such as a secure real-time clock 120, cryptographic accelerator 121 for secret-key cryptography, arithmetic accelerator 122 for public-key cryptography, random value generator 123 for cryptographic key generation, and/or other such peripherals and components as may be needed to perform a desired set of secure operations. Such peripherals may be required only in certain environments to support specific system functions, and are not required as components of an SPU. However, to the extent that peripheral functions are security-critical (e.g., access to functions is permitted only for the security management software/firmware), such peripherals should be included within the SPU's tamper-resistant boundary.

To protect against tampering, SPU 100 may include tamper-detection sensors 111-115 for detecting attempts to breach tamper-resistant barrier 110 and for performing tamper-response functions in response thereto. For example, breach-detection sensor 111 can detect physical tampering with the SPU's package 110. Light-detection sensor 112 can detect light that may be introduced as a side-effect of opening the SPU's package. Radiation sensor 113 can detect radiation, such as X-rays, that may be used in an attempt to determine the configuration of components within the SPU's package. Radiation sensor 113 can also detect attempts to use such radiation to disrupt the operation of SPU 100 temporarily in order to cause it to misbehave in a predictable or analyzable manner. Temperature sensor 114 can be used to detect attempts to place the SPU at temperature extremes that would disrupt its operation and/or render the tamper-response circuits ineffective. Input error sensor 115 can detect attempts to introduce non-standard input signals into the SPU's standard electrical interfaces (such as the power, clock, and data inputs) in order to disrupt its operation (for example, by causing some parts of processor 101 to experience extra clock pulses). Tamper-detection sensors 111-115, as well as other tamper-detection sensors that may be desirable, are connected to tamper-response logic 116, which causes SPU 100 to respond to tampering by, for example, erasing its internal storage of secret information from memory 102. It will be appreciated that depending on the level of security that is desired, in some embodiments only some (or none) of the illustrative tamper-detection sensors shown in FIG. 1A may be included.

Figure 1B:
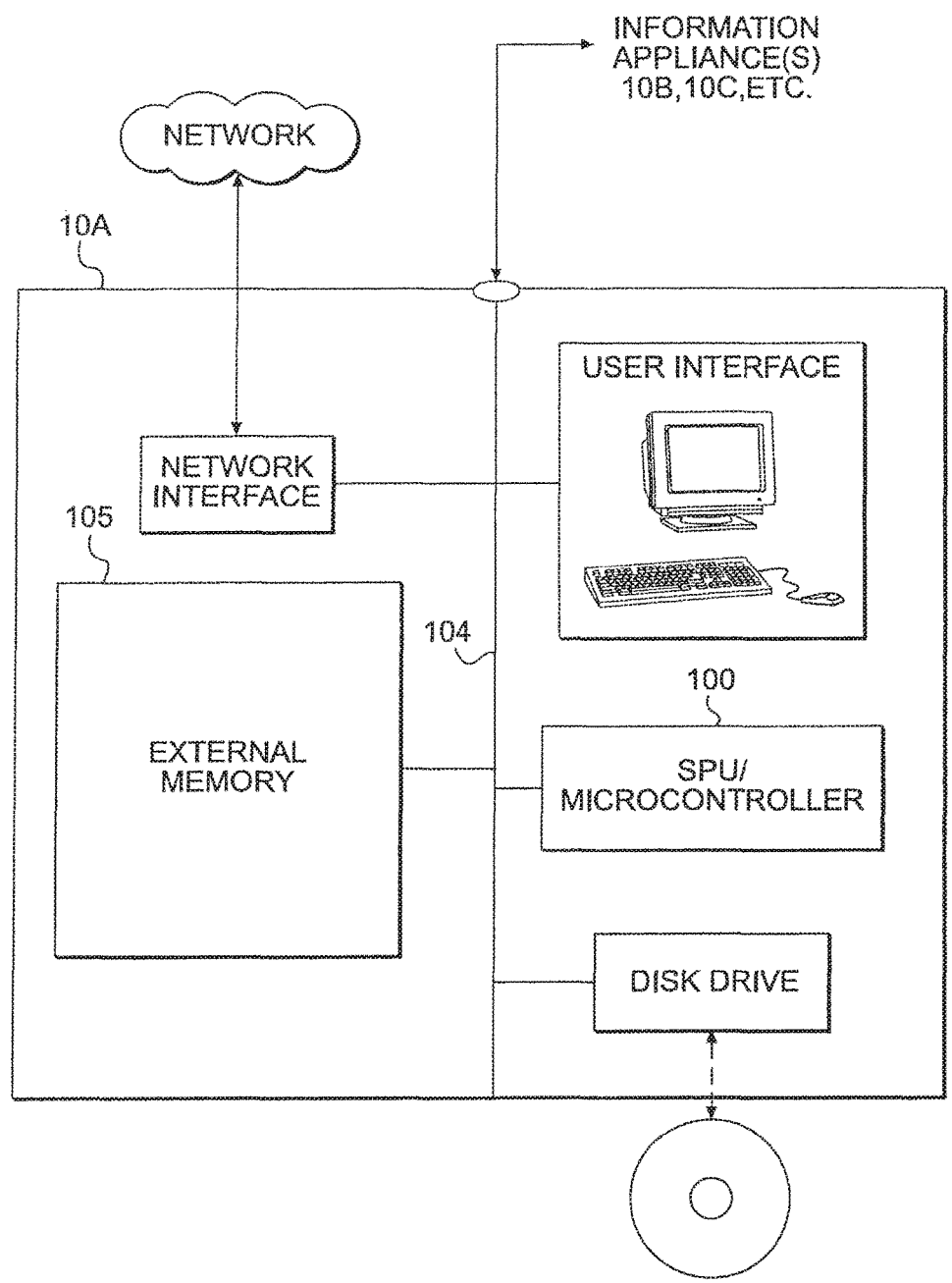
FIG. 1B shows an information appliance in accordance with an embodiment of the present invention.

SPU 100 can be implemented in a variety of ways. For example, in a preferred embodiment SPU 100 is formed by modifying the design of a conventional microcontroller or CPU (e.g., an ARM, MIPS, SPARC, or INTEL® IA-32 microcontroller/microprocessor, or the like) to include the functionality and features described herein. As shown in FIG. 1B, the resulting microcontroller/microprocessor 100 could then be included in place of the conventional microcontroller/microprocessor in an information appliance 10 such as a portable device, personal computer, television set-top box, cellular telephone, workstation, or the like. As described in more detail below, such a modified microcontroller/microprocessor would be able to provide the functionality of the conventional microcontroller/microprocessor, and would also be able to perform secure rights management, financial transactions, or other sensitive operations typically performed by a separate SPU. (Additional examples of the potential uses of an SPU can be found in the '900 patent, which is hereby incorporated by reference in its entirety). Thus, the present invention can obviate the need to include a separate SPU in an information appliance 10; instead, using the techniques described herein, the security features of a separate SPU can be advantageously and efficiently integrated with the functionality and features of a general-purpose processor or microcontroller. Alternatively, the novel features and functionality described herein could be used in the design of a wholly new microcontroller/microprocessor, and thus it will be appreciated that the present invention is not limited to modifications of existing processor or microcontroller designs.

1. Single-Chip VLSI Microcontroller SPU Architecture

Figure 2:
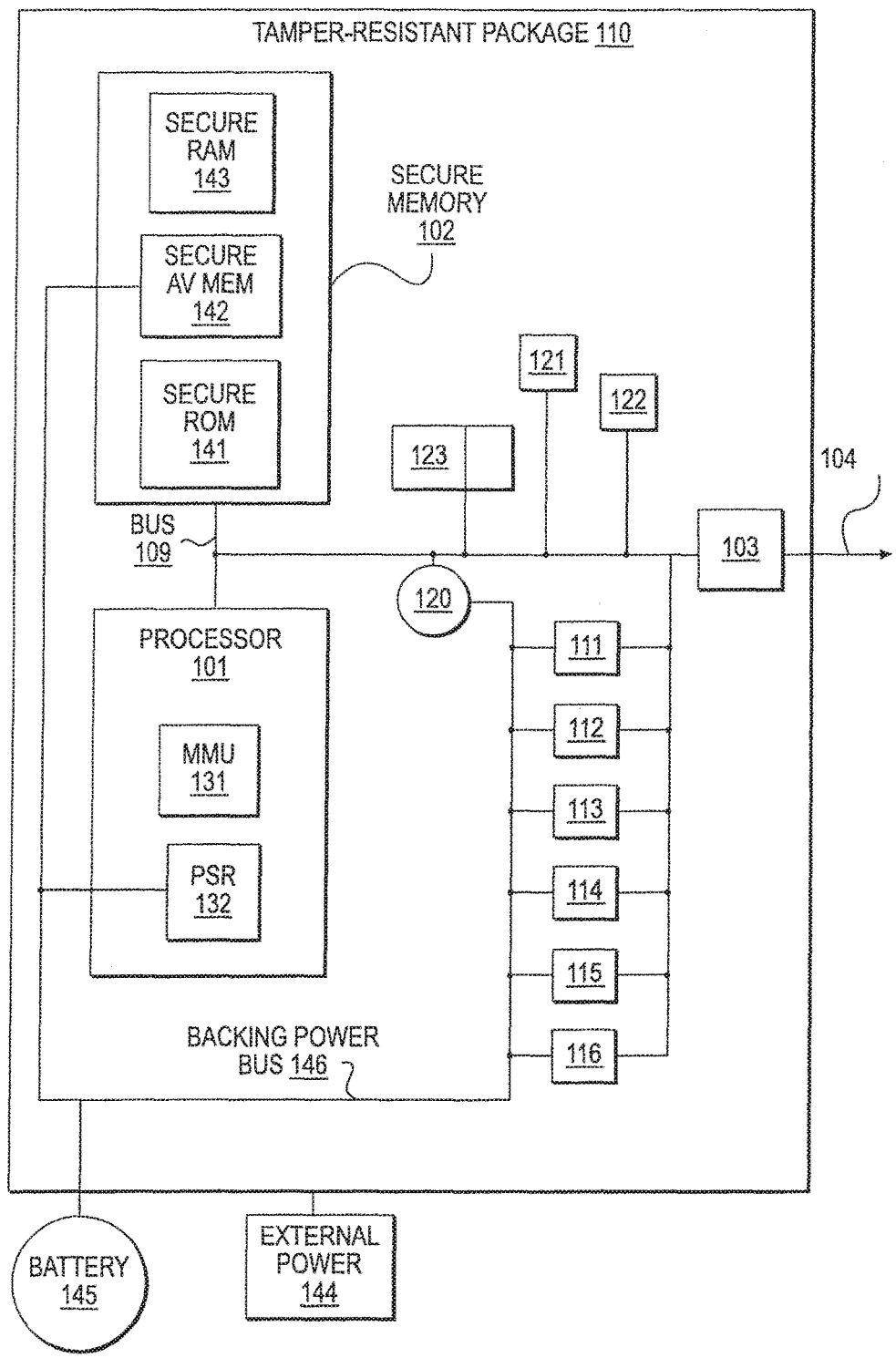
FIG. 2 further illustrates a preferred embodiment of SPU hardware.

FIG. 2 provides a more-detailed illustration of certain hardware aspects of an SPU in accordance with an embodiment of the present invention. As shown in FIG. 2, in one embodiment SPU 100 comprises a VLSI chip encased within a tamper-resistant package 110. SPU 100 can be powered both by external power supply 144 and by battery 145. In the embodiment shown in FIG. 2, secure memory 102 includes three parts: secure read-only memory 141, which may be programmed by the manufacturer during the VLSI production process, and which typically cannot be easily altered thereafter; secure non-volatile memory 142, which can be read and written by processor 100, and which may be powered by battery 145 so that its contents are retained at all times; and secure volatile memory 143, which is powered by external power supply 144 and whose contents are lost when power supply 144 is disconnected.

In the embodiment shown in FIG. 2, SPU 100 operates principally when powered by external power supply 144, which may be supplied intermittently, but also receives power continuously from battery 145, which provides power to non-volatile memory 142, real-time clock 120, tamper detection sensors 111-115, and tamper-response logic 116 through backing power bus 146.

If battery 145 is disconnected or disrupted, or if tampering is otherwise indicated, tamper-response logic 116 can be made operable to respond by clearing some or all of the information stored in non-volatile memory 142. Even if system power is interrupted, such tamper-response actions can be performed in a very short time (preferably a single clock cycle), and can be performed using stored power still available on-chip (e.g., in small on-chip capacitors). In other embodiments, multiple types of tamper response signals may be defined, to distinguish, for example, between a random glitch on an input signal and a deliberate attempt to tamper with the system (e.g., a breach of the SPU's physical packaging). In response to these different signals, different parts of non-volatile memory 142 may be cleared, and/or registers may be set to indicate to monitoring software which event occurred. These distinctions can thus aid decisions about tamper recovery.

As shown in FIG. 2, in a preferred embodiment external bus 104 permits SPU 100 to access memory devices and/or other peripherals outside of tamper-resistant package 110, but does not permit devices outside the package to request access to internal resources. That is, external bus 104 provides output-only addressing, but can transfer data for both input and output purposes. In other embodiments, external bus 104 may also be designed to support input addressing, so that external devices (including other processors) can initiate "direct memory access" (DMA) to the internal resources, memory, and/or other components of SPU 100. In such embodiments, processor security registers 132 can be used to indicate which internal resources permit or do not permit such external access.

2. SPU Monitor Software Structure

Figure 3:
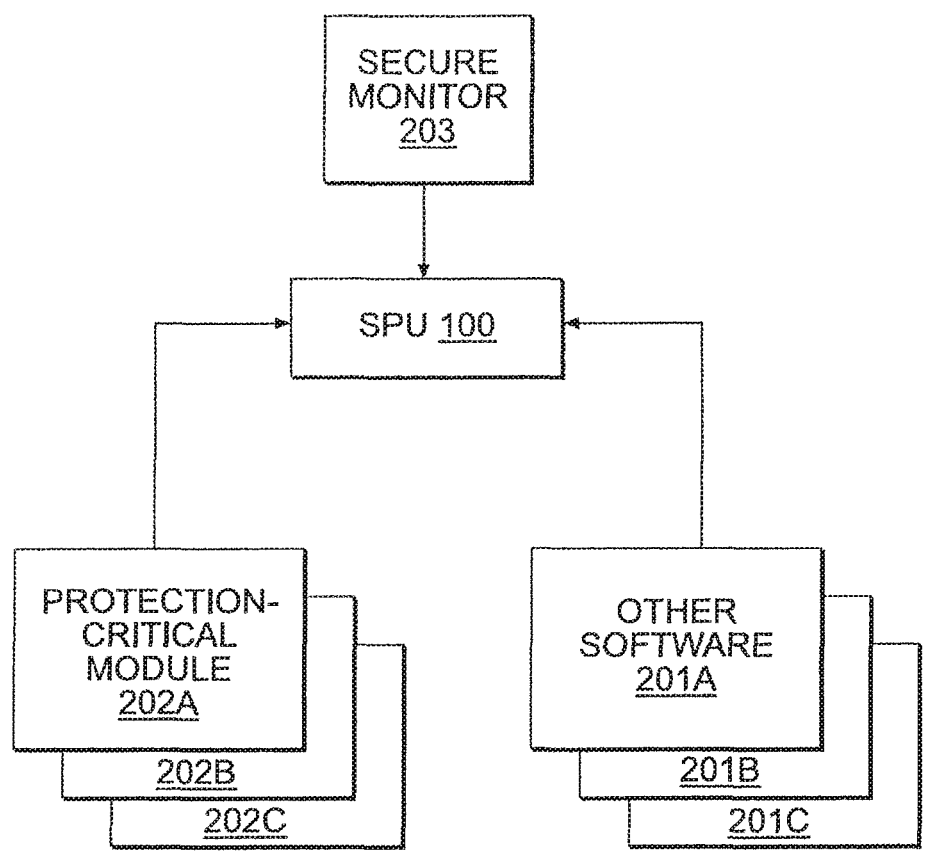
FIG. 3 introduces the software structure running on the SPU.

FIG. 3 shows software running on SPU 100 that includes both protection-critical software 202 and other software 201. For example, in a very simple information appliance such as a music player, protection-critical software 202 might include the digital rights management software governing encryption/decryption of, access to, payment for, and/or reporting of digital music content being played, and other software 201 might include the software that provides the player's user interface (e.g., control of an LCD display, user interface buttons, etc.), the music decoding software that converts compressed digital music into audio samples, the file system for storing encrypted digital music files, etc. Both software 201 and software 202 may comprise many modules, only some of which may be resident in secure memory 102 at any particular time. Software modules will typically be resident in separate memory spaces and have access to memory spaces controlled by monitor 203 so that they are effectively isolated from each other. As described in more detail below, in a preferred embodiment secure monitor software 203 enables the loading and unloading of software modules into SPU 100, and controls access to memory management unit 131, processor security registers 132, and other protection-critical resources within SPU 100. Monitor 203 may use protection facilities (e.g., a memory management unit (MMU) that provides independent control for access to different pages and/or segments of memory) already present in conventional, off-the-shelf processors (such as those conforming to the INTEL® IA-32, ARM, MIPS, or SPARC architectures), to effect the desired isolation.

In one embodiment, monitor 203 has two primary functions:

1. It virtualizes hardware resources in the system containing SPU 100, in the sense of establishing itself as a virtual machine operating system supervisor that can present other software components 201 and 202 with the appearance of running on a bare machine computer. It is useful to provide such an appearance since software implementers then need have only minimal awareness of the monitor, and can program for the SPU environment without learning new interfaces. In some applications, however, it may be appropriate to provide an interface more closely tied to the monitor software, because that facilitates making trade-offs among efficiency, size, and/or performance (which factors may affect any of the software components, not just the monitor software).

2. It manages the loading and swapping of other software components 201 and 202 to ensure that only valid components are operating.

Monitor 203 differs from a conventional virtual machine supervisor (e.g., the Control Program of the IBM VM/370 operating system) in that it distinguishes between resources internal to SPU 100 and those outside. In particular, monitor 203 is responsible for managing secure internal memory 102 and for ensuring that activities such as software and/or external hardware tampering do not cause it to be accessed in an invalid manner. Conventional virtual machine supervisors typically assume that the entire computer under their control is physically secure and free from tampering. In contrast, and as described in more detail below, SPU 100 typically only considers the internal resources to be secure.

3. SPU Memory Protection With MMU

In a preferred embodiment, processor 101 includes memory management unit 131, which is used by monitor 203 to isolate memory regions accessible to different software modules. Memory management unit 131 can employ a variety of familiar mechanisms to effect such isolation, including paging, page protection, segmentation, segment limits, protection domains, capabilities, storage keys, and/or other techniques.

Because a typical memory management unit, such as that characteristic of the ARM architecture, translates virtual addresses to physical addresses with little or no restriction on the physical address values resulting from that translation, in some embodiments of the present invention all of the translation tables are kept in internal memory 102 in order to guarantee their integrity and to ensure that only monitor 203, and specific authorized hardware functions (e.g., the MMU) can manipulate them. If translation tables were stored outside SPU 100, external system components, which may be under control of (or directly represent) an adversary, could alter their contents and potentially permit user-mode software modules to access protection-critical data or the monitor itself.

Figure 5:
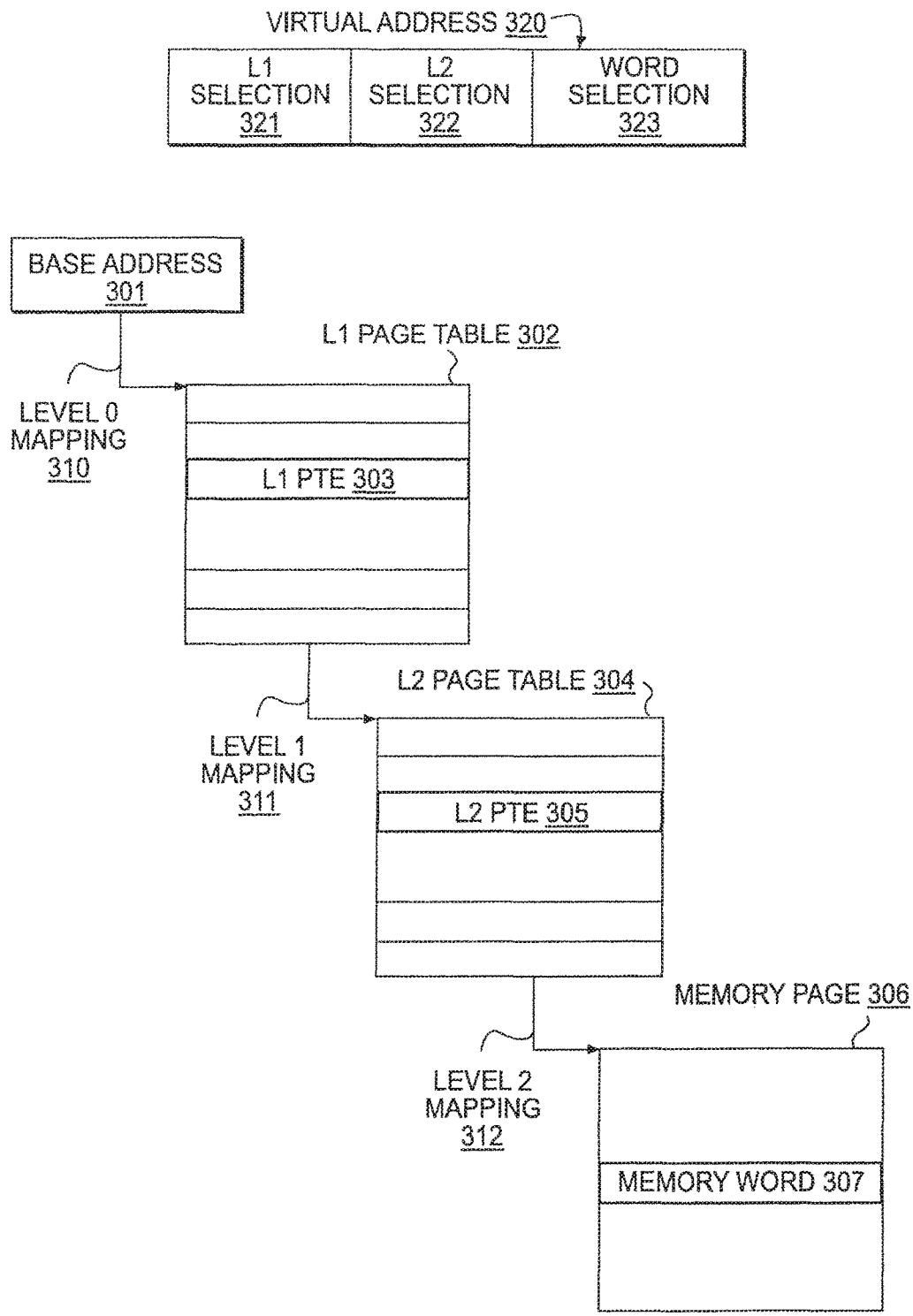
FIG. 5 illustrates a virtual address translation mechanism.

FIG. 5 shows a typical memory management unit employing multi-level page translation. Similar schemes are found in the VAX, IA-32, ARM, System/370, and many other architectures. In this example, virtual address 320 is divided into three parts: level-one selection 321, which selects an entry in level-one page table 302; level-two selection 322, which selects an entry in level-two page table 304; and word selection 323, which selects a word from memory page 306. An initial level-zero mapping 310, which locates the base of level-one page table 302, is specified by the processor's paging base register 301. This embodiment assumes a single instance of level-one page table 302, although it is possible that several base registers could be used to designate multiple such tables based on other bits in virtual address 320. Additionally, attributes for level-one page table 302, such as those described below, may be specified in base register 301. The level-one mapping 311, which locates the base of one of the level-two page tables 304, is specified in level-one page table entry 303, which may also specify attributes for the specific level-two page table it designates. The level-two mapping 312, which locates the base of one of plural memory pages 306, is specified in level-two page table entry 305, which may also specify attributes for the specific page it designates. Alternative embodiments may specify more levels of mapping by, for example, dividing virtual address 320 into more parts (or fewer levels, with fewer address parts). Further, alternative embodiments may define different numbers of mapping levels or types of mappings based on attribute information in the page tables. Alternative embodiments may also locate page tables and pages by different structures, such as an inverted page table, which performs a hash-based lookup of the virtual address to translate it.

As described in more detail below, several techniques may be used, alone or in combination, to reduce the dependence on internal protected memory 102 for storing memory translation tables. These techniques include:

1. Certain regions of physical memory (most importantly, some or all of internal memory 102) can be designated "critical" and access to those regions restricted to certain processor operating modes.

2. A "non-critical only" protection attribute can be used to designate certain translation tables as being permitted to specify address translations only to "non-critical" addresses. If this attribute is present in a level-one (or earlier) page table entry stored in critical memory, it is safe for the level-two (or later) page tables that it designates to be stored in non-critical memory since manipulation of those page tables will not result in a translation designating critical memory (and thus cannot grant access to critical memory). Thus, this technique can reduce the amount of critical memory required for page tables.

3. Large translation tables can be reduced in size by address re-mapping in cases where much of the table is empty.

4. Multiple level-one page tables can be designated for different parts of the virtual address space by different base registers. This technique can allow even certain level-one page tables to reside in non-critical memory because the base registers can specify the "non-critical only" attribute, further reducing the amount of critical memory required.

3.1. Memory Protection by Physical Address

In a conventional virtual memory system, such as that characteristic of the ARM or IA-32 architectures, protection is based solely on protection attributes (e.g., access control bits in page tables) associated with virtual (logical) addresses, and is enforced by a memory management unit during the process of translation from logical to physical addresses. In a preferred embodiment of the present invention, an additional, independent level of protection is applied based on physical addresses. This "critical address" protection ensures that accesses to critical internal addresses, such as those of internal memory, control registers, and memory-mapped internal peripherals, is restricted to appropriate software components, based on processor operating modes or other restrictions, and applies regardless of (i.e., as a further restriction on) access rights specified in MMU data structures (e.g., page tables).

Figure 8:
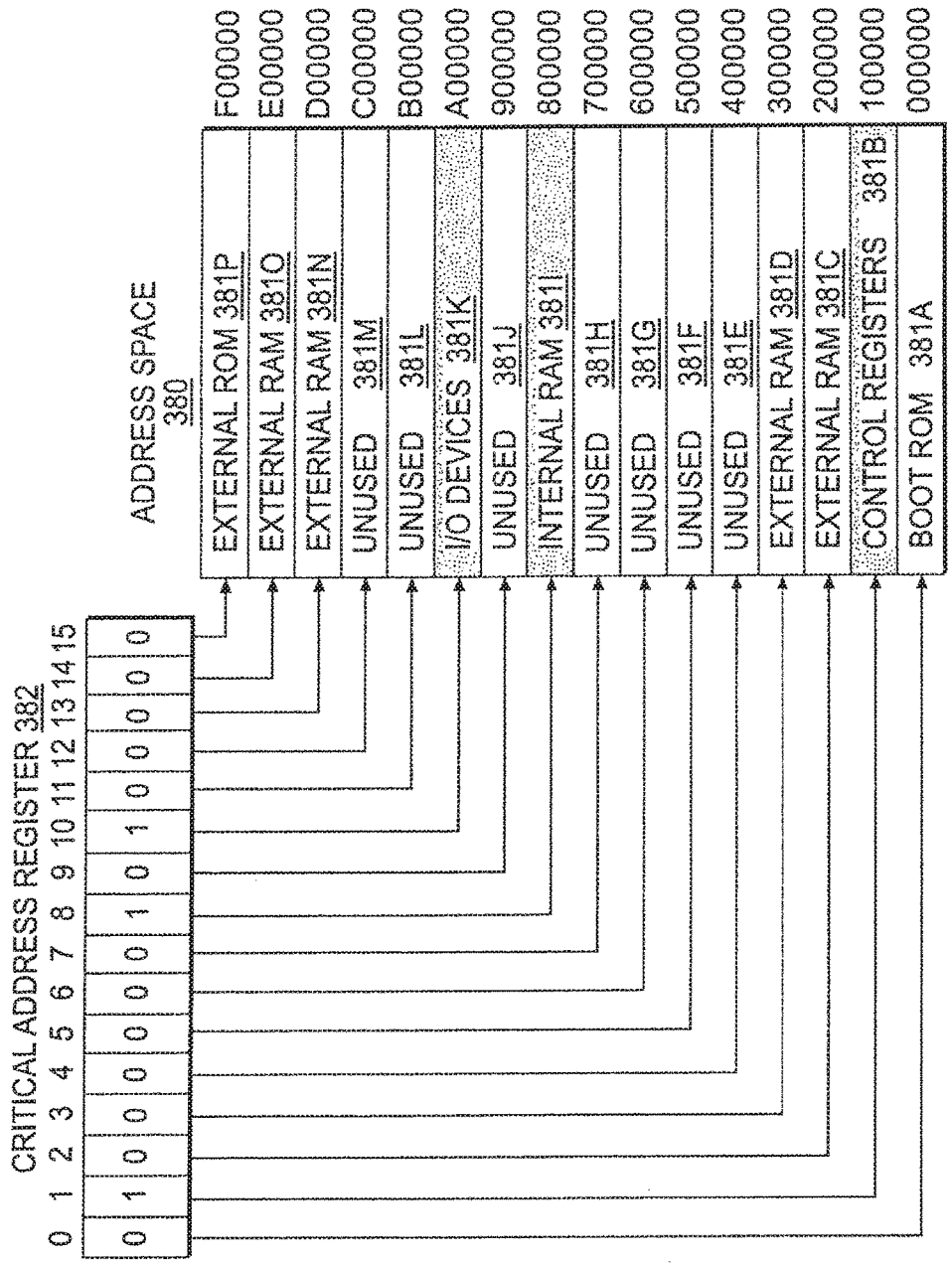
FIG. 8 indicates how physical address space can be divided into regions designated as "critical" or "non-critical."

FIG. 8 shows an illustrative embodiment in which the full 16-megabyte physical address space 380 of an SPU-enabled microcontroller is divided into one-megabyte segments 381A-381P. Segments 381 include, for example, external ROM 381P, internal RAM 381I, control registers 381B, and so forth. In this example, a 16-bit critical address register 382 (e.g., one of the processor security registers 132) has a bit corresponding to each segment; the value of the bit specifies whether the segment is considered critical, and therefore accessible only in an appropriately privileged processor mode (e.g., supervisor mode) and/or only for appropriate functions such as address translation, or whether the segment is considered non-critical, and is not subject to critical address controls.

Figure 9:
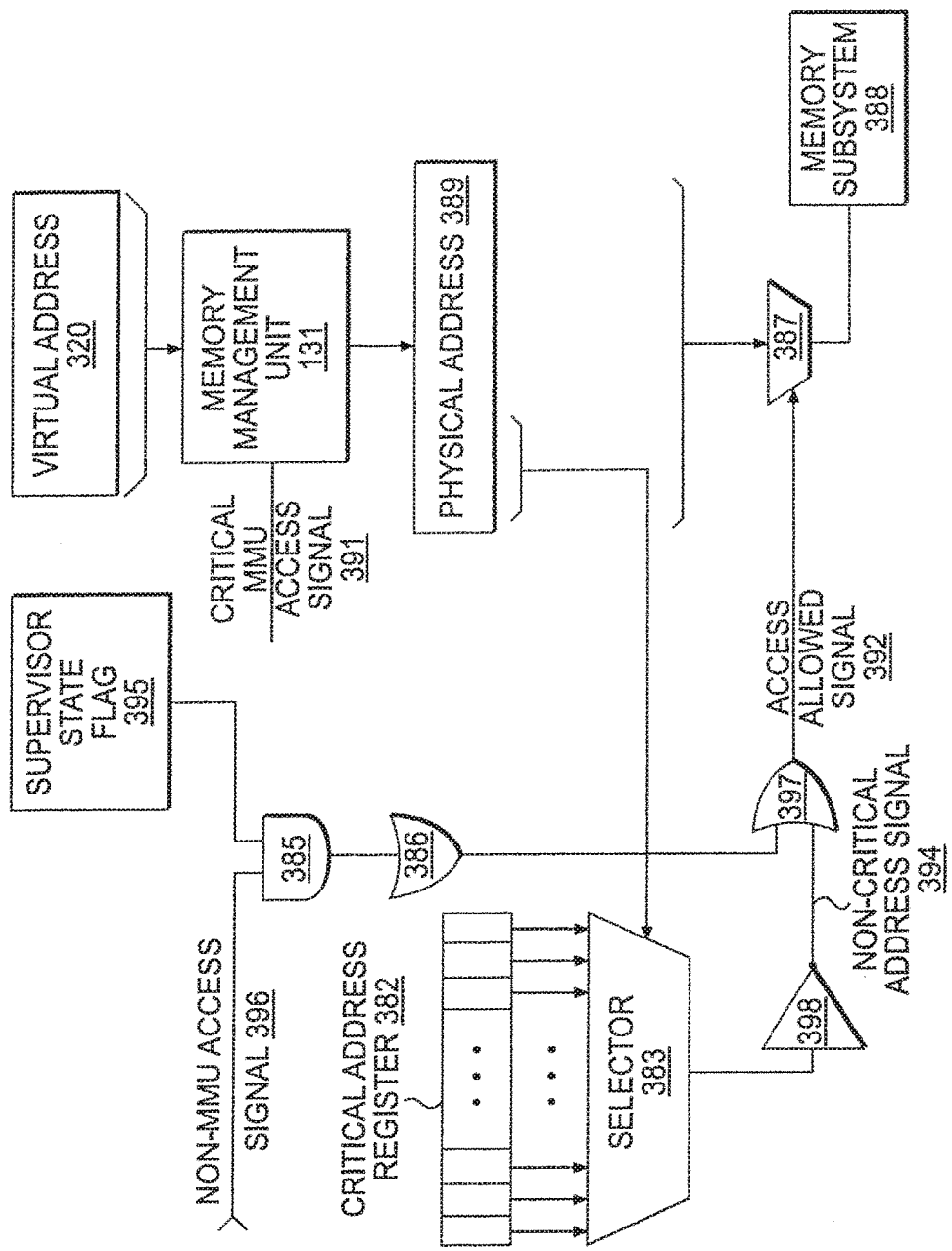
FIG. 9 shows an illustrative embodiment of logic for making critical access decisions.

FIG. 9 shows an illustrative embodiment of logic for making critical access decisions. One bit of critical address register 382 is selected by selector 383 using the upper four bits of physical address 389, and is complemented by logical-NOT function 398 to yield non-critical address signal 394. Signal 394 indicates that a particular physical address is (or is not) non-critical (i.e., is potentially subject to adversarial manipulations). To determine the relevance of that signal, non-MMU access signal 396 and supervisor state flag 395 are combined by logical-AND 385 to indicate that "critical address" protection should not be checked. (Note that signal 396 and flag 395 will typically be readily available or derivable from the MMU circuitry of conventional microcontrollers/microprocessors, signal 396 being operable to indicate whether a particular memory reference is being made to fetch instructions or data to be processed by the CPU proper, or whether the reference is being made to fetch a page table entry to be processed by the MMU). The purpose of the check embodied by logical-AND 385 is to allow data and instruction references to critical memory by monitor software 203 (which preferably runs in the processor's most privileged mode) but to prevent even that software from making address translations through page table entries with the "non-critical only" attribute set. If the latter check were not made, it would be potentially possible for an adversary to construct page table entries that monitor software 203 would unwittingly use to access data in critical memory as if it were a page table entry. The output of logical-AND 385 is combined using logical-OR 386 with critical MMU access signal 391. MMU access signal 391 is generated by memory management unit 131 to indicate that a page table entry is being fetched (as opposed to an ordinary processor access resulting from translation of a virtual address), and that the page table is permitted to be in a critical address region. Signal 391 is effectively the inverse of the "non-critical attribute" described in more detail below. The output of logical OR 386 is combined using logical OR 397 with non-critical address signal 394 to drive selector 387, which determines whether output physical address 389 from memory management unit 131 is permitted to be used by memory subsystem 388. Note that memory subsystem 388 is a logical construct representing all addressable memory in the system, whether internal or external.

In other embodiments, decisions about permitting access to critical memory can be based on a variety of other criteria, and can apply differently to different regions of memory. For example, access can be permitted only for particular execution domains, processes, instruction locations, and/or other attributes, rather than being based primarily on a user/supervisor mode distinction. As yet another example, different rules might be specified for read accesses and write accesses to different critical address regions.

3.2. Internal Memory Protection

In addition to specifying access and usage rules for large ranges of physical address space (which may represent internal memory, external memory, peripherals, control registers, and/or other functions), it is useful to be able to specify such protection for distinct small regions of internal secure memory 102. For example, the first time monitor software 203 or one of its logical components executes, it may initialize certain values that are not changed again during normal operation. In such cases, it is useful to ensure that such memory cannot be written, even in the face of an error elsewhere in monitor software 203 that inadvertently addresses such memory.

Figure 12:
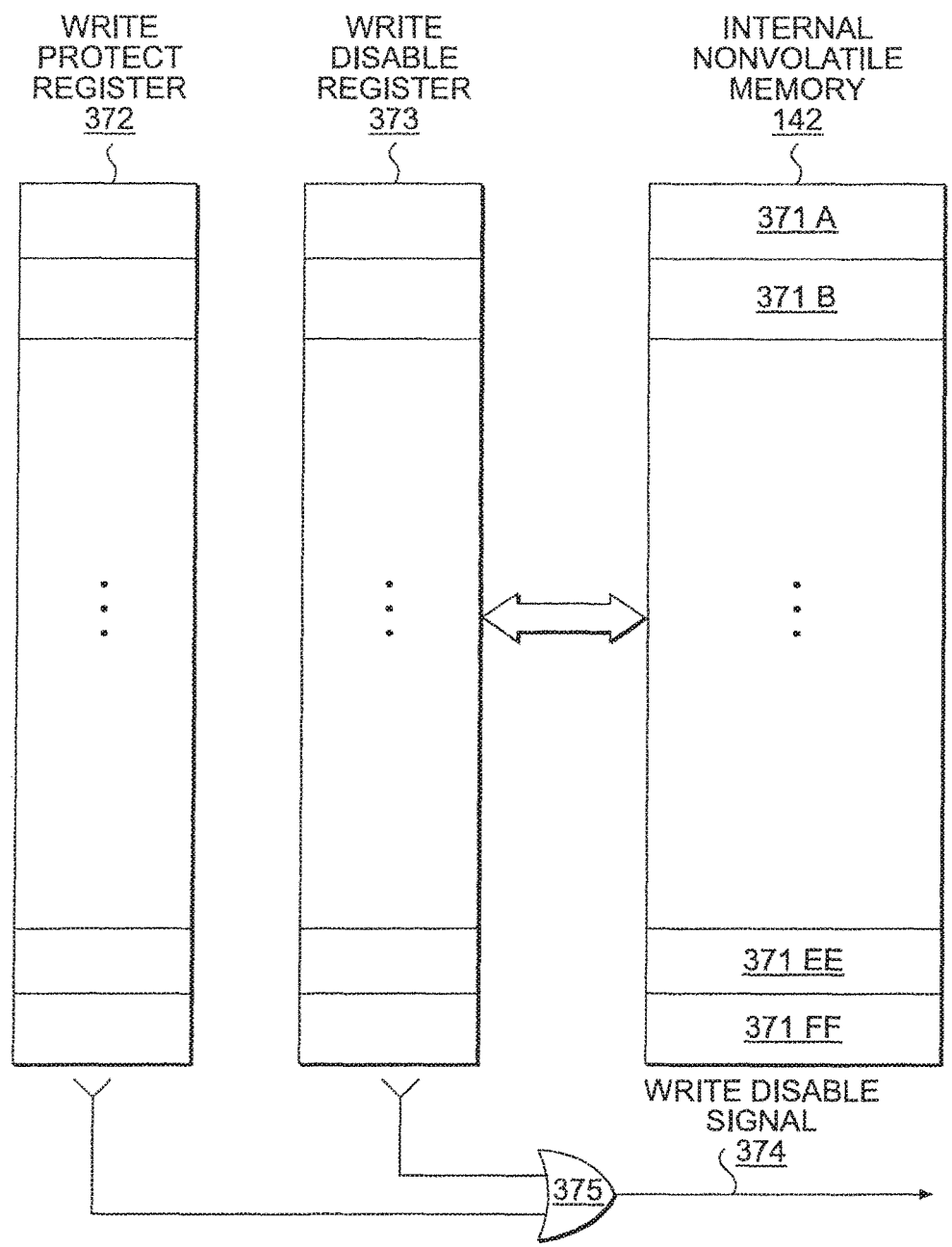
FIG. 12 illustrates registers and logic for protecting small regions of internal memory.

FIG. 12 shows an illustrative mechanism for protecting internal memory in accordance with an embodiment of the present invention. In this example, 32 kilobytes of internal non-volatile memory 142 is divided into thirty-two, one-kilobyte regions 371*a*-371*ff*. Internal write-protect register 372 and internal write-disable register 373 each have 32 bits, corresponding to regions 371*a*-371*ff*. A write access to a memory region succeeds if the corresponding bits in both registers are zero, meaning that writing is neither protected nor disabled. In other words, write disable signal 374 is the logical OR 375 of the selected corresponding bits in each register.

The difference between registers 372 and 373 is that the bits in write-protect register 372 can be set and cleared repeatedly, whereas write-disable register 373 is "sticky"— any bit set in register 373 cannot be cleared (e.g., because the register is designed to latch, but not reset), (except by removing any battery backup power and erasing internal memory 142 and clearing all other registers. In some embodiments SPU 100 may provide an external "master clear" signal to force erasure of all memory and all registers (e.g., in the event of an externally detected tamper indication); however, registers 372 and 373 are preferably not altered by the tamper-detection logic or other tamper-response activities except for the master clear signal or other function intended to disable the SPU completely (or at least until some recovery action is initiated).

Similar protections can be applied to internal read-write memory 143 (if distinct from memory 142), and additional registers such as registers 372 and 373 can be used to protect a larger number of internal memory regions, thus enabling protection of a larger amount of internal memory and/or protection at a smaller granularity. Further protection against error can be provided by requiring a special access mechanism for setting registers 372 and 373; for example, rather than mapping individual bits to regions of memory, each register can be a set of byte-wide values, with each byte corresponding to a protected region. The registers can require that a special value (for example, a random 8-bit constant, or such a constant XOR'd with the region number) be stored in the register in order to set (or clear) the corresponding bit in the register corresponding to one protected memory region. Alternatively, a single set of byte-wide registers can be used for both the write-protect and write-disable functions. For example, setting such a register to 0x60 might temporarily enable writing, setting it to 0x71 might temporarily protect against writing, setting it to 0xA3 might permanently disable writing, and subsequently setting it to any other value would then be ignored (or those constants could be XOR'd with the index of the region being controlled). Thus, it should be appreciated that there are a wide variety of ways to implement the functionality shown in FIG. 12.

3.3. Memory Protection by Page Table Attribute

Another technique for reducing the amount of internal protected memory 102 needed to store the memory management tables is to locate some of those tables outside of "critical" memory. The designation of critical addresses may, for example, be accomplished in the manner previously described in connection with FIGS. 8 and 9, or by using an alternative mechanism.

In one such embodiment, level-one page table entry 303 may include a "non-critical only" attribute for the page table it designates, the attribute indicating that the page base addresses in level-two page table 305 can designate only "non-critical" memory regions, as defined by processor security registers 132. In such an embodiment, processor security registers 132 can be used to designate internal memory as critical, but external memory 105 (accessed by external bus 104) as non-critical. Designation may be on the basis of address and length, fixed address partitioning (e.g., a protection designation bit for each 1/16th of the address space as shown in FIG. 8), storage keys associated with addresses, or other similar mechanisms. If a level-two page table entry 305 is found to contain a protection-critical address when the "non-critical only" attribute was present in the level-one page table entry 303 that refers to it, memory management unit 131 indicates an exception and the access is not permitted. This technique permits the bulk of page tables to be stored outside protected memory 102 without enabling an external agent to breach security, as long as the level-one page table 302 is kept internally and/or is otherwise inaccessible.

In other embodiments, the "non-critical" attribute can be present at other levels. For example, if more than two levels of page mapping are employed, any level could indicate that subsequent levels might use only "non-critical" addresses. As another example, if multiple base registers are employed, they can indicate whether a level-one page table is permitted to use "non-critical" addresses. In addition, address protection can be made more fine-grained by defining multiple attributes—such as protection domains (e.g., like those present in processors conforming to the ARM architecture) or storage keys (e.g., such as those used in IBM 370 architecture devices)—that are used to determine the validity of physical page mappings.

3.4. Memory Protection Optimization by Address Remapping

Another technique for reducing the amount of internal protected memory 102 needed to store the memory management tables is to reduce the size of the tables. As shown in FIG. 5, level-one page table 302 should be large enough to hold a level-one page table entry 303 for each possible value of level-one address selection 311 (for example, 4096 entries of 4 bytes each, or 16,384 bytes total, selected by the upper 12 bits of the virtual address). In some architectures (e.g., Intel IA-32), these limits on level-one page table size are implicit (e.g., IA-32 segment length values can be used to ensure that only part of the level-one page table is needed) or are provided as part of the base MMU function, while in other architectures (e.g., MIPS, which manages address translation through special-purpose software), these limits can be implemented in software or firmware. However, in some architectures (e.g., ARM), the tables are always expected to be full-size: there is no way to restrict the virtual addresses the CPU can generate, and thus the entire level-one page table must be available to attempt translations of those addresses—even if most such addresses are not valid, the corresponding level-one page table entries are still required to have a place to indicate that the addresses are not translatable. Even if the architecture defines the tables as full-size, however, a memory subsystem can be designed to limit their scope through mapping. An illustration of such an embodiment is described below.

Figure 6:
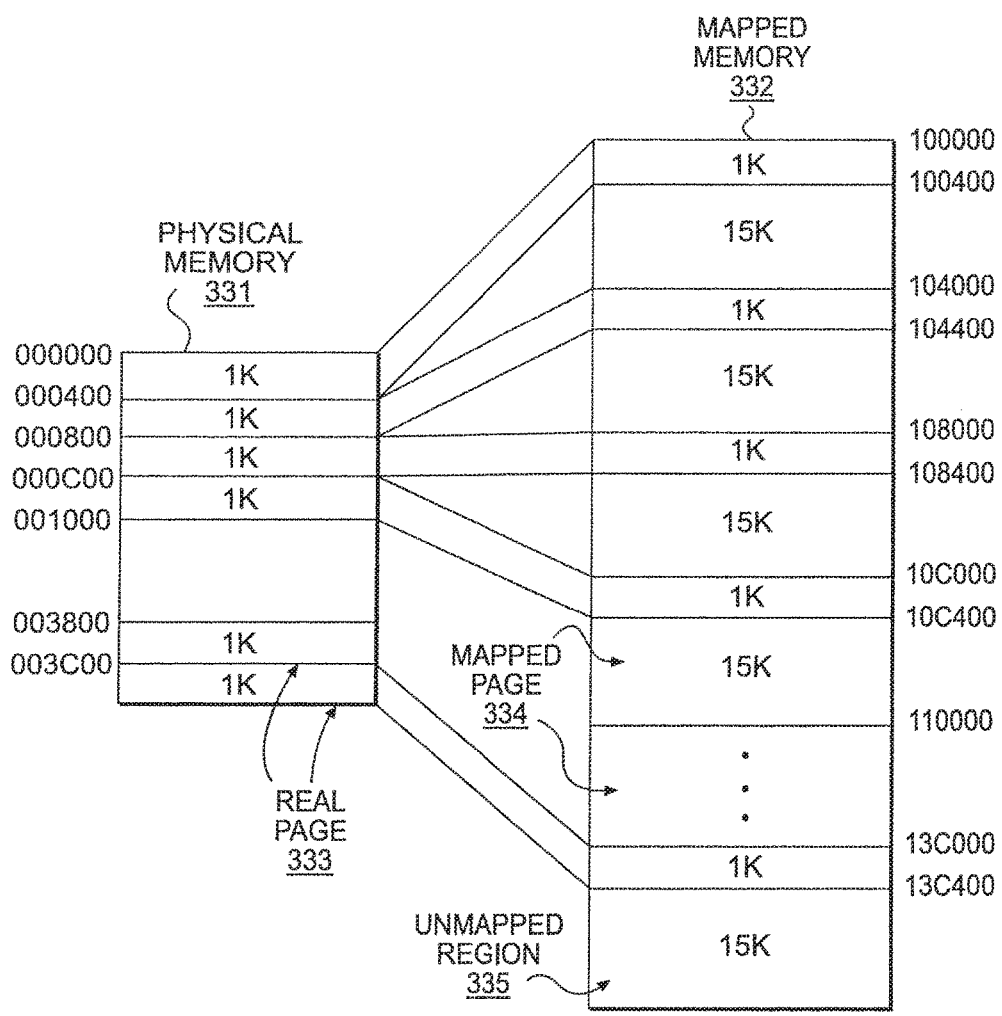
FIG. 6 shows an example of address re-mapping to facilitate reduction in memory management table size.

FIG. 6 illustrates the correspondence between physical memory 331 and virtual address space 332 in one embodiment of the present invention. These two regions of address space represent the same physical storage locations; that is, the addresses in the range 0x100000 to 0x13FFFF are decoded to reach the same locations as 0x000000 to 0x004000. In the example shown in FIG. 6, sixteen kilobytes of physical memory 331 is divided into 1024-byte real memory pages 333, while 256 kilobytes of mapped memory 332 provides sixteen sets of 1024-byte mapped pages 334 and 15-kilobyte unmapped regions 335 (note that mapped memory 332 should not be confused with the virtual address space; the mapping referred to here is a fixed mapping that "scatters" a set of physical memory locations into a larger region of physical address space). As shown in FIG. 6, there is a one-to-one correspondence between mapped pages 334 and real pages 333, but unlike the real pages, the mapped pages are not contiguous in the address space. When read, unmapped regions 335 return, e.g., all zeros; when written, they either ignore the written data or generate an exception, as defined by the SPU architecture.

In such an embodiment, it is possible to specify that, for example, a level-one page table 302, which is nominally 16 kilobytes in extent, resides at a mapped location (e.g., 0x108000). If this is done, the first kilobyte of the table is located in real physical memory, but the remaining 15 kilobytes are read as zeros, which will indicate a page fault (or other appropriate) exception. Placing the page table into this region reduces the total size of the virtual address space by a factor of 16, because only the first 1/16 part of the level-one page table is in actual memory, but it also reduces the size of the level-one page table to an amount that can fit more comfortably into a small internal memory. Even though only part of the architecturally defined level-one page table is manipulable, that typically provides more than enough virtual address space for applications.

In a preferred embodiment, the same region of physical memory may be re-mapped multiple times, at different granularities. For example, there may be a part of the address space that maps to 1-kilobyte pages, with 15 kilobyte unmapped regions, and another part that maps to 4-kilobyte pages with 12 kilobyte unmapped regions. Having a variety of such regions with different ratios of mapped and unmapped memory provides flexibility for the software to use the minimal set of such regions as are necessary to support the required virtual address space. The number and extent of such mappings can be adjusted by the processor architect to suit the needs of the system.

Other re-mapping schemes can be used to achieve similar or more powerful effects. For example, re-mapping can be based on an offset/length calculation, or on a set of associative prefix registers that re-map a small, designated set of addresses, rather than whole regions of the internal memory space.

3.5. Memory Protection With Multiple Level-One Page Tables

Another technique for reducing the size of the level-one page tables that are kept in internal memory is to use multiple base registers in combination with a "non-critical only" attribute (such as that described above) in those base registers for subsequent address processing. For example, memory management unit 131 might include three base address registers 301, one of which defines mapping for the high end of the address space (e.g., addresses for which a designated number of high-order address bits are all equal to 1), one for the low end of the address space (e.g., addresses for which a designated number of high-order address bits are all equal to 0), and one for all other parts of the address space.

Figure 7:
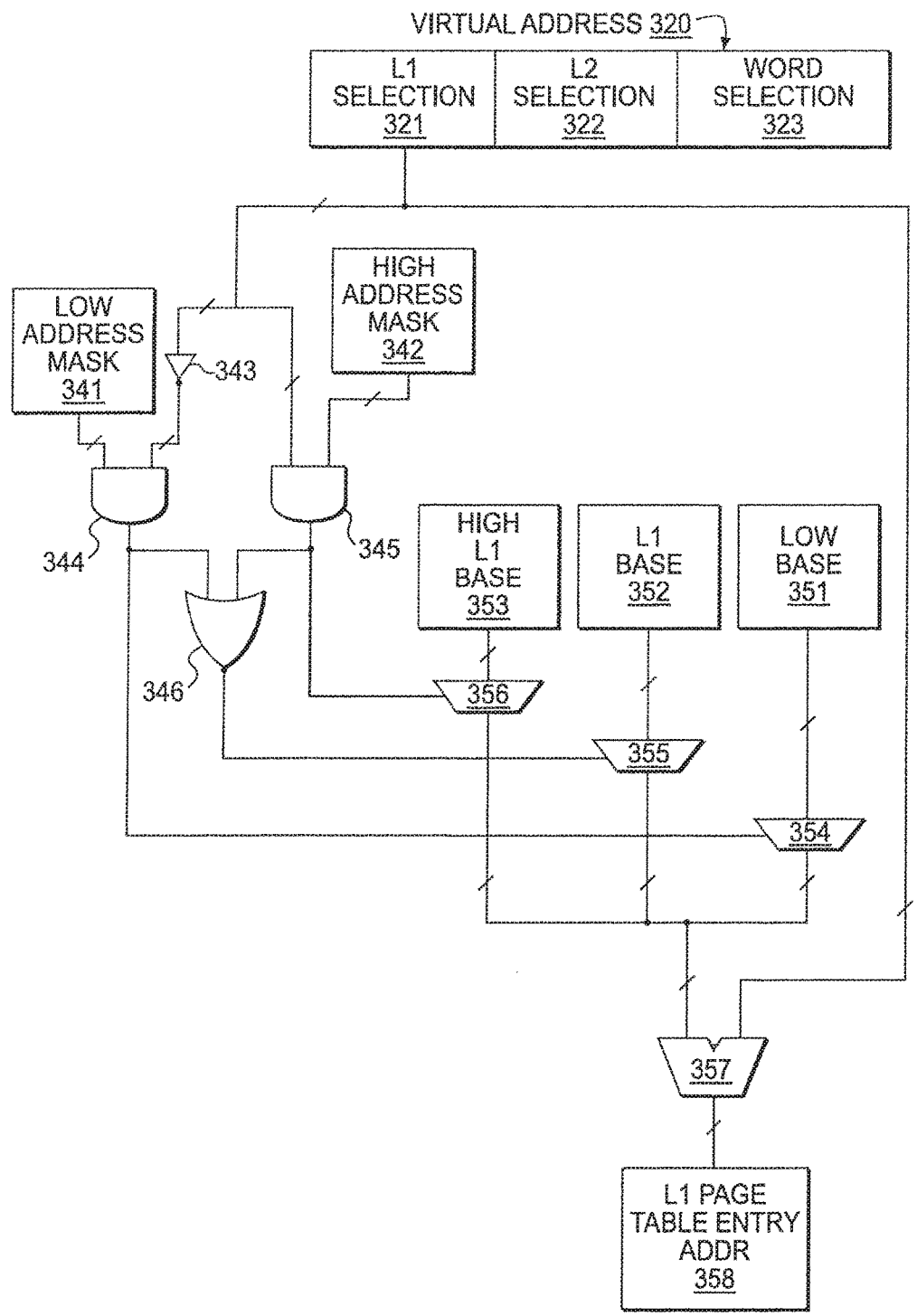
FIG. 7 shows an embodiment employing multiple page table base registers to allow parts of the level-one page table to reside in unprotected memory.

FIG. 7 shows an illustrative embodiment in which three distinct level-one page tables are used. The level-one selection 321 portion of virtual address 320 is routed to two selection logic blocks involving masks 341 and 342 (note that in FIG. 7 a slash through a signal line indicates a potentially multi-bit bus). In this embodiment, mask values (typically set in a processor configuration register) are used to allow the software to choose which high and low addresses are mapped through the special base registers, but it is to be appreciated that other techniques could be used to divide the level-one page table into two or more parts that can be located in different memory regions. For example, use could be made of techniques such as fixed selections, selection among a larger set of base registers by direct mapping from high-order address bits, or arithmetic comparison to identify one or more address ranges to be handled by a distinct page table, can be used. If all the bits selected by low address mask 341 are set in the output of complement function 343, as determined by mask comparison 344, that triggers selector 354 to deliver low level-one base address 351 to combiner 357. If all the bits selected by high address mask 342 are set in the address, as determined by mask comparison 345, that triggers selector 356 to deliver high level-one base address to combiner 357. Otherwise, regular level-one base address 352 is delivered to combiner 357 as triggered by logical NOR 346. Combiner 357 combines the address base value with level-one selection value 321 to determine level-one page table entry address 358, which is used to fetch a level-one page table entry. Combiner 357 may be an arithmetic add, logical OR, or other function suitable for generating that address, possibly incorporating additional masks or offsets.

Alternative embodiments can select among multiple base registers using fixed criteria (e.g., select one of 16 registers based on the upper 4 bits of the address), using additional registers to hold base address register numbers for different parts of an address space, through a base/length calculation, or through other familiar means.

To provide a protected memory space for secure monitor software 203, mask registers 341 and/or 342, and base registers 351 and 353 can be set up so that the level-one page tables for appropriate portions of the highest and lowest parts of the virtual address space are kept in internal protected memory 102, but base register 352 can designate a level-one page table in unprotected external memory 105. In combination with the "non-critical only" attribute (as previously described), which in this embodiment is held as part of, or is associated with, each base register 351-353, this approach would mark the high and low parts of the virtual address space as critical, and manageable only by secure monitor 203 (because those registers would only be accessible in the privileged mode of the monitor software), while allowing other software 202 to manage page tables for the rest of the virtual address space. If secure monitor 203 provides a "virtual machine" environment, it can detect references by other software 202 to parts of the apparent level-one page table that are designated by base register 352 but actually redirected by base and mask registers 351, 353, 341, and 342. Upon detecting such references, it can validate the reference and, if appropriate, emulate the operation the reference was intended to perform by updating the real copies of those parts of the page table in protected memory in the conventional manner of a virtual machine operating system's emulation of memory management functions.

3.6. Protection For Control Registers

Processor security registers 132 and other internal control registers (such as those that control I/O ports, peripherals, etc. that may be a part of external interface 103) may be present in a region of the processor's physical address space. To minimize the size of address translation tables, such registers may be compactly allocated in a small region (e.g., one page), such that a single memory management translation entry describes them all. However, if all such registers are allocated together, it is generally not possible to protect different registers by different access controls because the granularity of address protection (typically a page of 4096 bytes) is not sufficient to distinguish among multiple registers defined at adjacent addresses.

To facilitate such protection, control registers may be defined to appear in two distinct parts of the physical address space: once where the address is decoded for a compact region containing all registers, and again where the address is decoded for a sparse region where only a single register or a closely associated group of registers are accessible in the scope of a single page.

Such dual decoding permits SPU monitor 203 to use a single address mapping (mapping some logical address to the physical page or pages where all control registers are present compactly) for system control purposes. Monitor 203 can also establish separate mappings for different processes, domains, or other logical constructs that map a logical page address to the single page where a particular control register (and no others, or no unrelated others) is decoded. In an architecture that supports sub-page access control granularity (e.g., ARM), an alternate decoding can place individual control registers or related groups thereof into distinct sub-pages, thus saving on address translation table entries. In such an architecture, three decodings (one compact, one sparse on page granularity, one sparse on sub-page granularity) maximizes flexibility for structuring monitor 203. The goal of these optimizations is to minimize the number of page table entries needed to protect the addresses that are used to refer to control registers, so that it is possible for monitor software 203 to refer to all of them efficiently yet also be able to grant access only to specific registers (e.g., those controlling one or more specific non security-critical peripherals) to other software.

It is to be appreciated that in architectures where address translation is partly or wholly under software/firmware control (e.g., MIPS, where the translation lookaside buffer entries are loaded explicitly), the techniques described above can also be implemented in said software/firmware.

4. SPU Memory Protection Without MMU

In an embodiment where processor 101 does not include memory management unit 131, secure monitor 203 can be used to ensure that other software modules 201 are run only in a controlled state, and only with access to appropriate parts of secure memory 102. In addition, secure monitor 203 may, if appropriate, also be used to constrain the execution environment for protection-critical modules 202 to non-supervisor state (or some other less privileged state). In some embodiments certain modules 202 may also be validly executed in the same protection state as monitor 203, depending on the architecture of monitor 203, providing that those modules are certified to operate safely before being granted access to operate in the same state as monitor 203.

One simple embodiment of processor 101 defines two processor operating modes: "user" mode and "supervisor" mode (as provided, for example, in the ARM and System/370 architectures). The supervisor (or "controlling") mode has capabilities and access (e.g., access to processor security registers 132) that are not available in the user (or "controlled") mode. Other embodiments of processor 101 may use multiple modes (some with characteristics of user mode, and others with characteristics of supervisor mode), privilege levels or rings of protection, multiple protection "domains" or "capabilities," and/or other features or techniques (e.g., protection levels in the IA-32 architecture, or domains in the ARM architecture).

Figure 4:
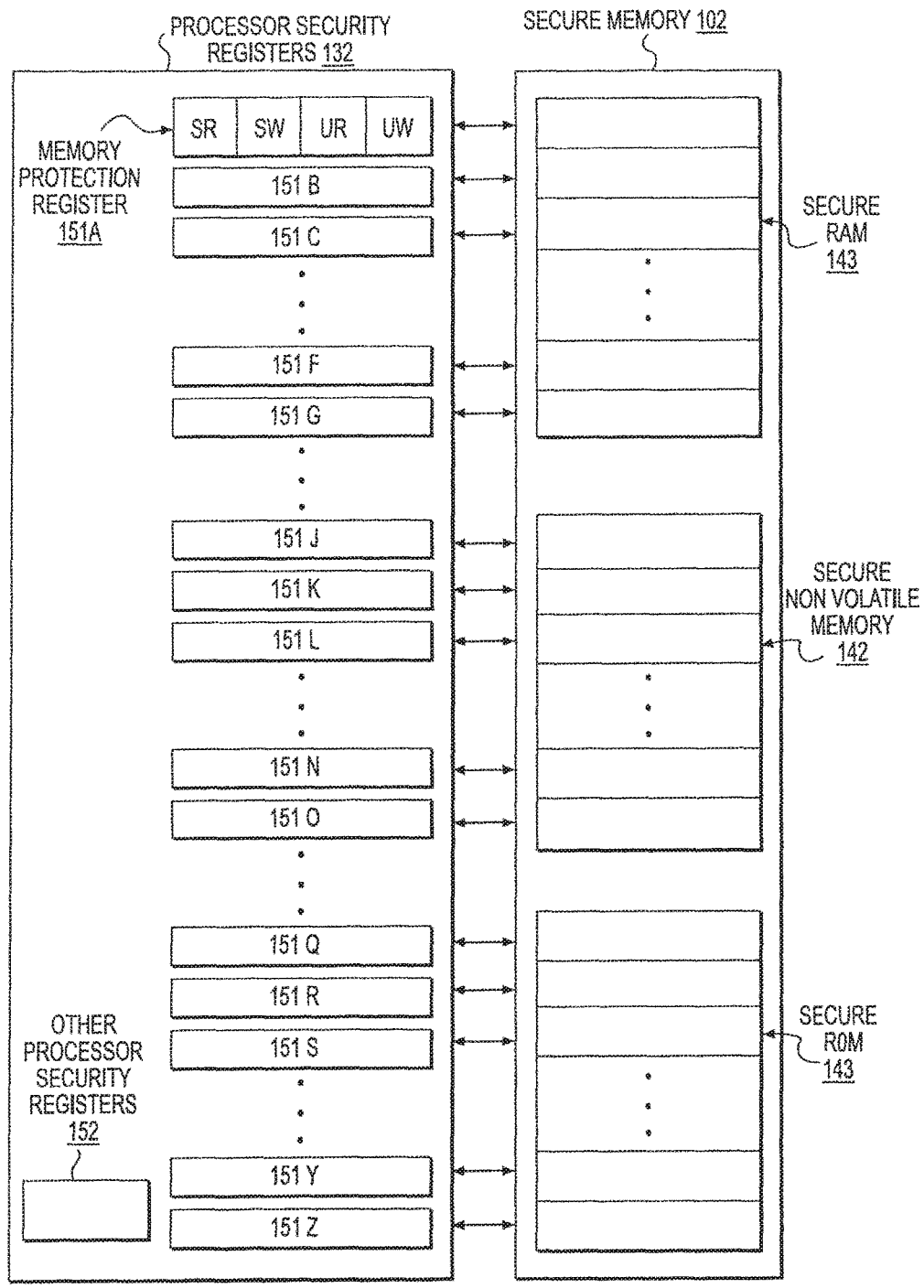
FIG. 4 shows memory protection registers corresponding to regions of internal protected memory.

In the aforementioned simple embodiment of processor 101, with user and supervisor modes, monitor 203 preferably runs in the supervisor mode of processor 101 so that it can access the processor security registers 132 containing access control information for different regions of secure memory 102. As shown in FIG. 4, protection for regions of secure memory 102 can be specified by memory protection registers 151a-151z, which, along with other processor security registers 152, form part of processor security registers 132. Each protection register 151a-151z specifies protection for a corresponding region, segment, or page of secure memory 102. A simple embodiment of the mapping between registers 151a-151z and memory 102 is that each register specifies protection for a contiguous region of fixed size and location within memory 102. Other embodiments could specify protected regions by base address and length, or by other suitable means. In the embodiment shown in FIG. 4, memory protection registers 151a-151z specify relatively simple protection rules, with four bits being used to indicate whether the corresponding memory region is readable in supervisor mode, writable in supervisor mode, readable in user mode, or writable in user mode, respectively. However, it will be appreciated that any suitable protection rules could be used. For example, other embodiments might specify protection based on domain, privilege level, storage keys, or other constructs. In yet another illustrative embodiment, memory protection registers 151a-151z contain a single bit specifying accessible/inaccessible, the bit being set explicitly by monitor 203 at the beginning of monitor functions and being reset upon exit from the monitor.

5. Monitor Software Initialization and Operation

In a preferred embodiment, monitor software 203 is established inside SPU 100, thus enabling it to operate securely. In addition, at least one secret cryptographic key is established internally to SPU 100, which enables monitor software 203, and possibly protection-critical software 202, to provide cryptographic proof of their identity and validity. For example, a challenge-response protocol could be used to authenticate SPU 100 to other trusted systems. See, e.g., Menezes et al., Handbook of Applied Cryptography, pp. 385-424 (CRC Press 1996) ("Menezes"), and commonly assigned U.S. patent application Ser. No. 09/628,692, entitled "Systems and Methods for Using Cryptography to Protect Secure and Insecure Computing Environments," filed Jul. 28, 2000, both of which are hereby incorporated by reference. Although monitor software 203 may be constant, and represented by the same bits in all instances of SPU 100 (e.g., located in secure internal ROM 141), the secret cryptographic key may be different in all instances.

Depending on system architecture, there are a variety of ways to establish monitor 203 in such a controlling position, so that it can exercise complete control over the SPU's resources and determine which resources are available to other software. One such technique is to fix monitor 203 physically in secure read-only memory as part of the manufacturing process, and to load a secret key into secure non-volatile memory 142 during the initialization process, subsequent to manufacturing. This technique is secure to the extent that the manufacturing and initialization process is secure, and battery power is established during that process and remains uninterrupted for the useful life of the device. If power is interrupted, the device should be securely reinitialized before performing protected functions. A variation on that technique is to load both monitor software 203 and the secret key into secure non-volatile memory 142, thus avoiding the need to fix the monitoring software during a manufacturing step. It will be appreciated that there are many additional options for the manufacturing and initialization steps. For example, the secret key can be fixed in the hardware (e.g., by laser modification of each part) during the manufacturing step, or the secret key could be loaded from an external source or generated inside the device so that it is never exposed externally.

For some security architectures, the secret key can be a symmetric key (see, e.g., Menezes at pp. 15-21, 191-282, which is hereby incorporated by reference), but that generally requires that its value be known outside the device. Thus, in one preferred embodiment asymmetric cryptography is used, so that the secret key need not be exposed externally yet can still prove its validity to others. See, e.g., Menezes at pp. 283-319, which is hereby incorporated by reference. In such an embodiment, there is typically a secret (or "private") key, a public key, a public identity value, and a cryptographic certificate generated during the initialization process that establishes a binding between the public key and the public identity value (and signed by a trusted authority such as the manufacturer). See, e.g., Menezes at pp. 543-590, which is hereby incorporated by reference. Note that it is not necessary for the SPU to maintain permanent internal storage of the identity or the certificate, providing they can be located (e.g., in external memory) when needed.

The entire path from manufacturing through initialization is preferably kept physically secure to prevent introduction of false SPUs prior to initialization. Once an SPU is initialized with its secret and its monitor software 203, it becomes self-protecting (because monitor software 203 is in control of the SPU's operation) and no longer requires such security. If the path from manufacturing to initialization (or to reinitialization, for cases in which the SPU's non-volatile memory is lost) is not physically secure, the SPU is vulnerable to attack by physical substitution: for example, an adversary might reverse-engineer a real SPU and construct a facsimile perfect in all respects except that its internal memory is accessible. If such an SPU can be introduced into the initialization step, the security of the other SPUs in the system may be compromised, because secrets used in common by multiple SPUs will generally be accessible to an adversary in the false SPU's internal memory. This threat can be reduced by, e.g., manufacturing SPUs in tamper-evident packaging that is difficult to replicate, and by inspecting candidate SPUs before initialization.

5.1. Reinitialization Process

Reinitialization is an important capability in many systems. If an SPU incorrectly decides that it is being tampered with and erases its memory, or if its battery power is interrupted (and it relies on battery-backed internal storage), its secrets may be lost and it may become unusable. Reinitialization is effectively the same as initialization, except that it may involve the recovery of some or all the SPU's accumulated state, and/or the validation of the SPU that is being reinitialized.

Figure 10:
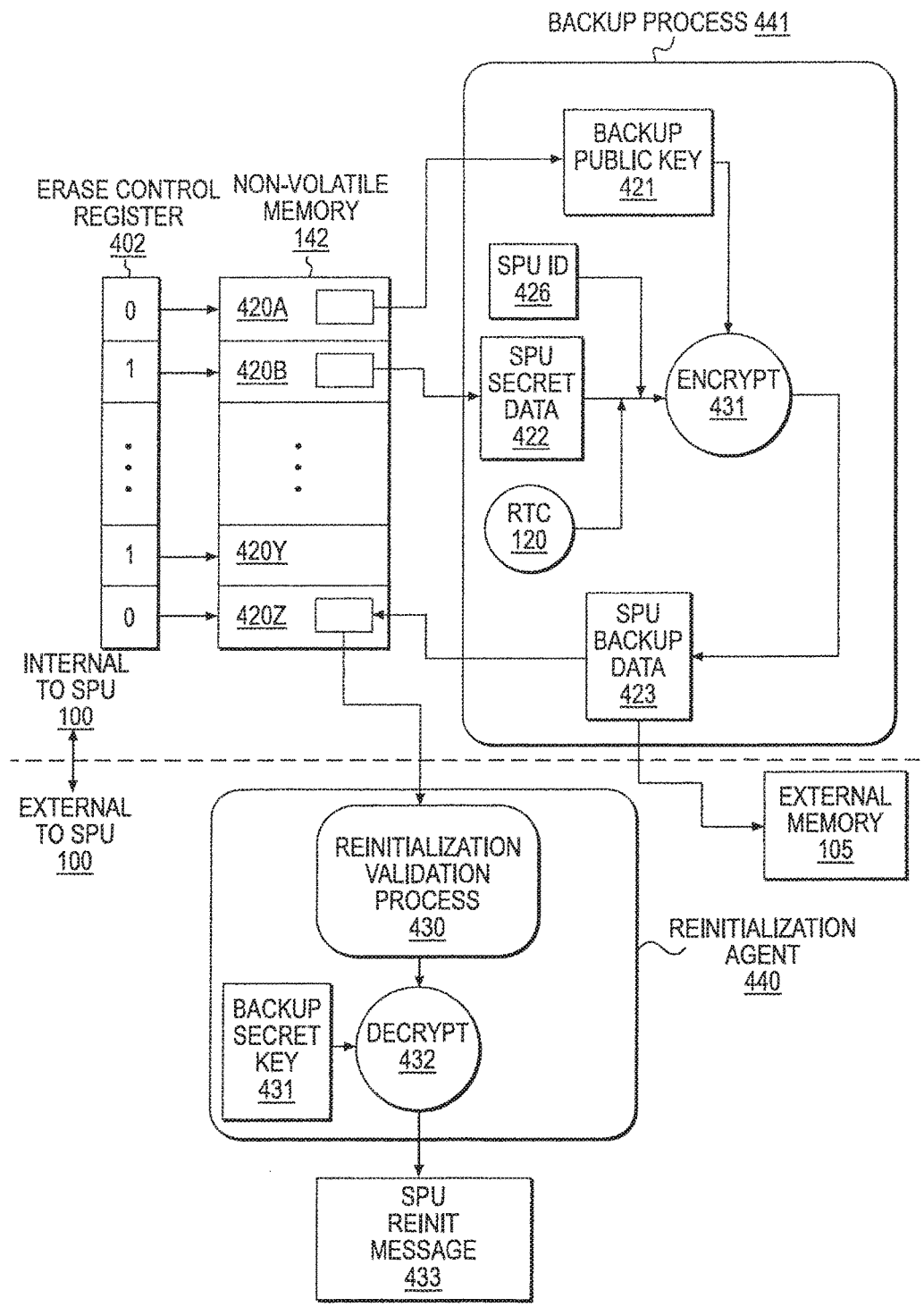
FIG. 10 shows an SPU reinitialization process in accordance with an embodiment of the present invention.

FIG. 10 shows a reinitialization process in accordance with an embodiment of the present invention. Referring to FIG. 10, internal non-volatile memory 142 of SPU 100 is divided into regions 420A-420Z. Erasure control register 402 (which is preferably part of processor security registers 132) contains one bit corresponding to each region 420A-420Z. Each bit indicates whether the corresponding region is to be cleared when tampering is detected by tamper response logic 116. Certain regions of internal memory 142 do not need to be cleared because their contents do not need to be kept secret in order to maintain the integrity of the overall system.

From time to time (e.g., periodically as determined by a timer, or following specific critical transactions or events) during operation of SPU 100, backup process 441 (e.g., part of monitor 203 or protection-critical software 202) runs, and, in one embodiment, performs the following process:

1. It obtains public backup key 421 from secure internal memory 142. This key is the encrypting half of an asymmetric key pair, the other half of which is held in a secure location by reinitialization agent 440.

2. It combines SPU identity information 426 (e.g., a serial number), SPU secret data 422 (e.g., the secret key or keys that represent this SPU's secrets), and the current value of real-time clock 120, and encrypts this combination using encryption algorithm 431.

3. It stores the encrypted result—i.e., SPU backup data 423—in secure internal memory region 420Z and/or in insecure external memory 105.

Note that most of backup process 441 need not be part of monitor software 203 in order to schedule and perform the backup operation, given appropriate support for the operation from monitor software 203. This enables monitor software 203 to be smaller and less complex. If backup process 441 is not part of monitor software 203 and is compromised, that may prevent the backup function from being performed, but does not compromise the secrets maintained by monitor software 203.

As shown in FIG. 10, monitor 203 (or protection-critical software 202) may have designated (e.g., by fixed configuration parameter or by request to monitor software 203) certain secure internal memory 142 to be preserved when tampering is detected (indicated by a zero-bit in erase control register 402). Thus, even after tampering is detected (correctly or otherwise), encrypted SPU backup data 423 is available inside the SPU (if battery power is retained), and may also be available in external memory 105 (although it may not be the most current such copy created). Other parts of secure internal memory 142 may also be retained, including, for example, a bootstrap loader or other reinitialization functions.

To reinitialize the SPU, external reinitialization agent 440 validates the request (430) (which includes validating that the SPU has not, in fact, been tampered with, e.g., by checking status of tamper sensors or validating checksums or digital signatures on internal memory), decrypts encrypted SPU backup data 423, and generates SPU reinitialization message 433 that can be delivered back to SPU 100. Decryption step 432 uses backup secret key 431, which is held securely by reinitialization agent 440. In a preferred embodiment, SPU reinitialization message 433 is encrypted and digitally signed with an appropriate (and highly protected) secret key held by SPU 100.

It is to be appreciated that reinitialization agent 440 may be implemented by a set of multiple independent systems, which can use threshold cryptography or multi-party computation schemes to ensure that compromise of some of the systems comprising reinitialization agent 440 will not result in compromise of the secrets required to restore SPU 100. See, e.g., Schneier, *Applied Cryptography*, 2d ed., pp. 68-73, 527-557 (John Wiley & Sons 1995), which is hereby incorporated by reference.

5.2. Loading Monitor Software

Figure 16:
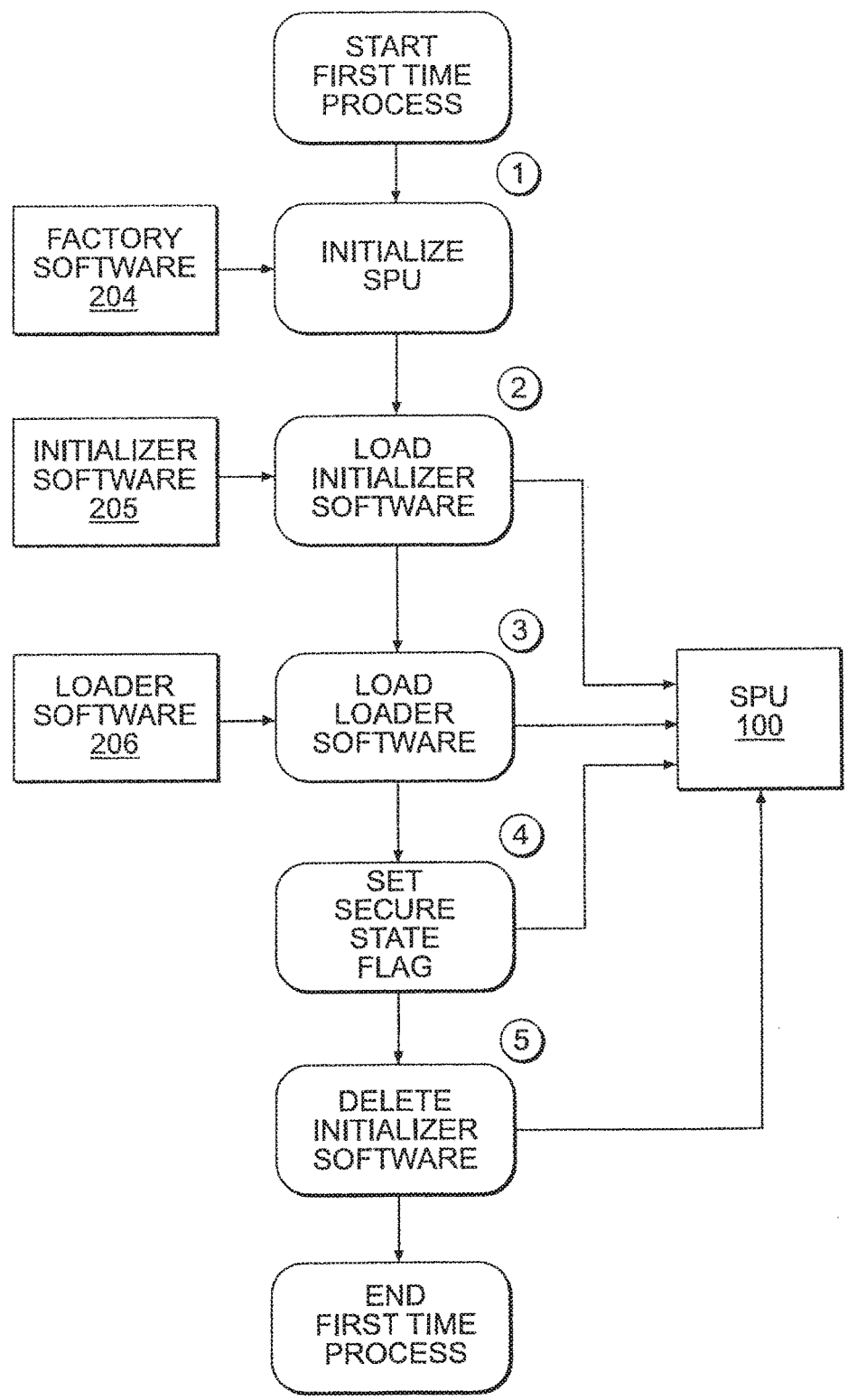
FIG. 16 illustrates a method for loading and starting secure monitor 203.
Figure 17:
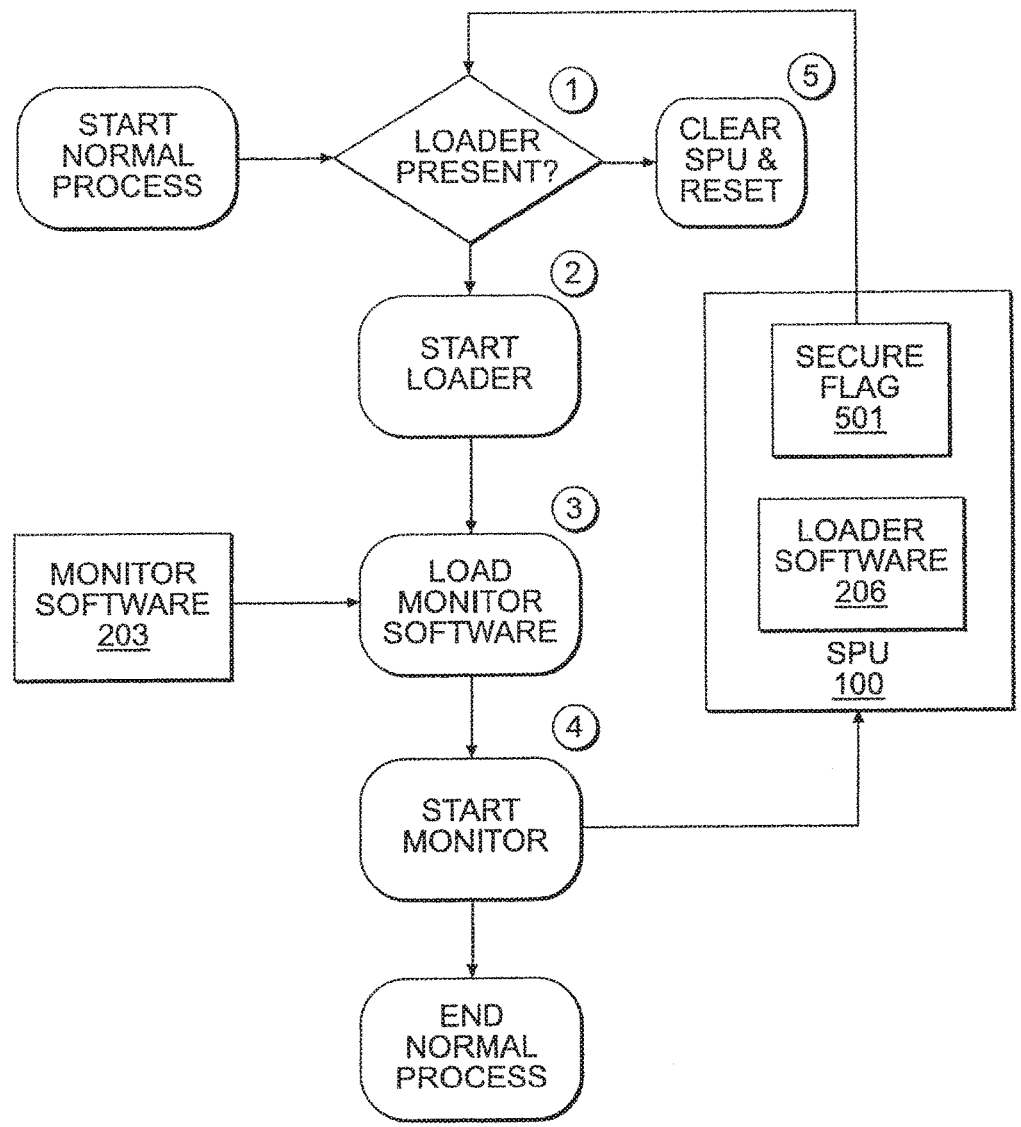
FIG. 17 illustrates the steps of one method for loading and starting secure monitor 203, in which monitor 203 is re-loaded each time the device is reset.

As previously indicated, there are a variety of ways to load and start secure monitor software 203. FIGS. 16 and 17 show an example of one such process, in which most steps are performed at a single secure facility (the "factory"), and in which monitor 203 is re-loaded each time the device is reset. Referring to FIG. 16, factory software 204 generates information required by SPU 100 (e.g., identity, keys, certificates, software), and loads that information into SPU 100 (e.g., by test ports, by memory access through external bus 104, by communication with initializer software 205 via external bus 104, or the like) (block 1 of FIG. 16). Factory software 204 preferably runs on a secure system at the factory responsible for initializing SPU 100, but typically does not run inside SPU 100 itself.

Initializer software 205 is preferably loaded the first time SPU 100 is operated (block 2 of FIG. 16). As described in more detail below, initializer software 205 establishes the "secure state" of SPU 100 by, e.g., setting certain flags in secure internal memory 142 or processor security registers 132. Initializer 205 preferably runs once and deletes itself afterwards (block 5 of FIG. 16).

Loader software 206 is responsible for loading monitor software 203 and possibly other modules, such as protection-critical software 202 or other software 201. Loader 206 is preferably the first software to run each time SPU 100 is reset or reinitialized with the necessary contents (e.g., identity, keys, certificates, software) of non-volatile storage preserved. In a preferred embodiment, loader 206 is a relatively simple program, concerned with loading and validating other modules (e.g., through digital signature validation). As shown in block 3 of FIG. 16, loader software 206 may be loaded by initializer software 205.

FIG. 17 provides a more detailed illustration of the operation of SPU 100, and loader software 206 and monitor software 203 in particular. Referring to FIG. 17, monitor software 203 is the first program loaded by loader 206 (block 3 of FIG. 17), and is responsible for managing the resources inside SPU 100 once it is started (block 4 of FIG. 17). Monitor 203 runs when SPU 100 is operating normally. Secure-flag 501 is a hardware register indicating that SPU 100 is in a secure state which is set by loader software 206 and/or monitor software 203 after a secure environment is established. A secure state is one in which SPU 100 may contain information that requires protection in internal secure memory 102. As indicated previously, the secure state is established by initializer software 205 (block 4 of FIG. 16), and is tested (block 1 of FIG. 17) to determine whether loader 206 is used after reset (block 2 of FIG. 17). Note that a secure state may exist even after tampering is detected; for example, part of secure internal memory 102 may be cleared, but backup copies of critical secrets may be retained in another part, as was shown in FIG. 10. In a preferred use of SPU 100, secure operation is preferably not required before initializer 205 has run. Before initializer 205 runs, SPU 100 may function as a non-secure microcontroller, and the software that runs on it need not make any use of the security features, or have any awareness of them. Therefore, in such embodiments it is desirable not to store secrets in SPU 100 (e.g., in internal memory 102) until after a secure state has been established by setting secure-flag 501.

Thus, an illustrative process for loading and starting secure monitor software 203 has been describe. It should be appreciated, however, that many variations of the process shown in FIGS. 16 and 17 are possible. For example, the steps shown in FIGS. 16 and 17 (or subsets thereof) can be performed in a variety of different orders or combinations. One of ordinary skill in the art will also appreciate that the components of the initialization process described herein may be combined as a single program (e.g., initializer software 205, loader software 206, and monitor software 203 could be combined if space constraints do not warrant their separation). In addition, it is possible that these software components may each be split into plural independent modules or steps, better to accommodate memory or other operational constraints.

5.2.1. Internal Memory Contents

Figure 11:
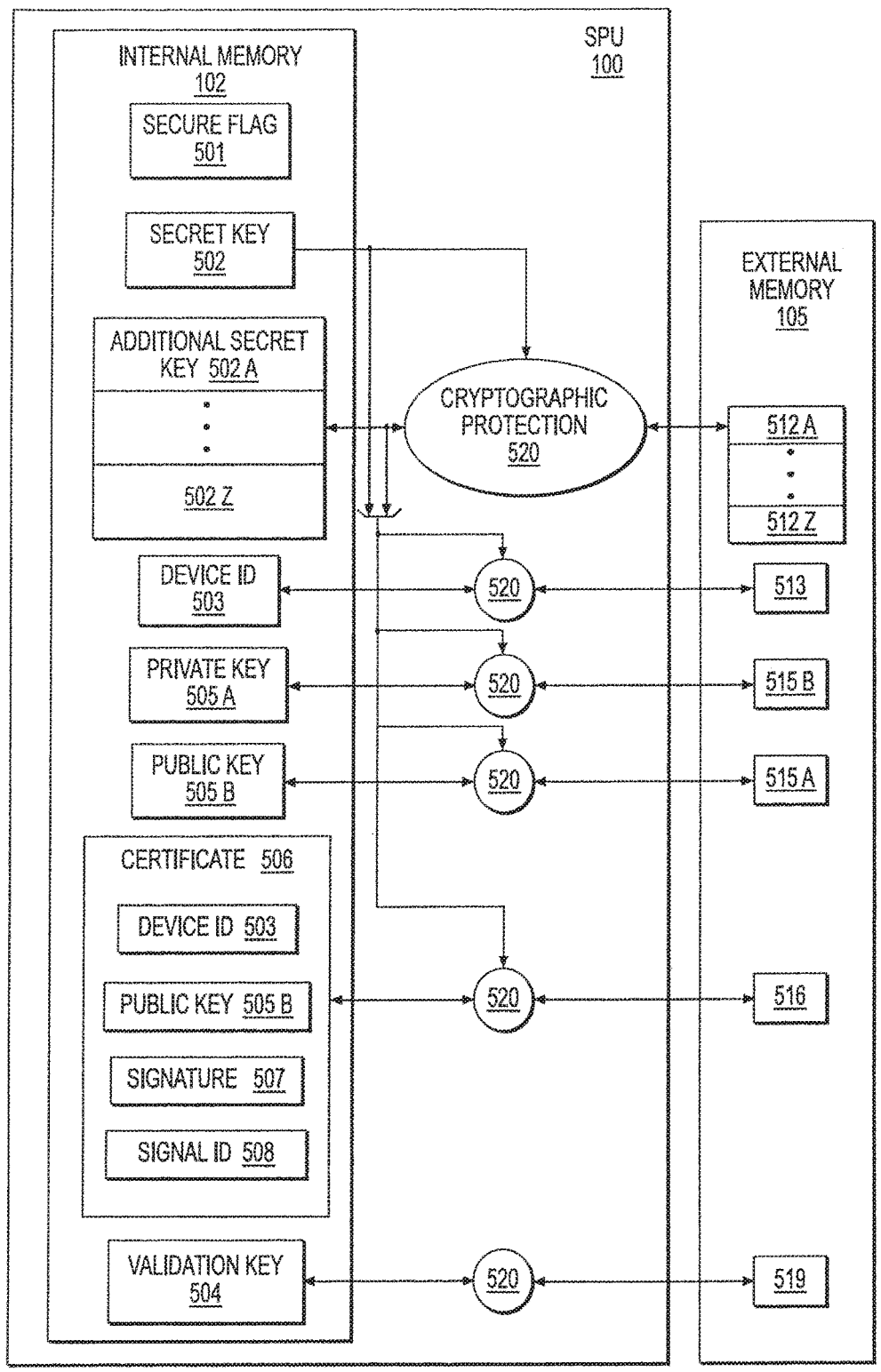
FIG. 11 shows some of the contents of the protected internal memory of an SPU in an embodiment of the present invention, and also shows how those contents may relate to the contents of external memory.

FIG. 11 shows some of the contents of protected internal memory 102 in an embodiment of the present invention, and also shows how these contents may relate to the contents of external memory 105. It is important to note that space in protected internal memory 102, and particularly non-volatile memory 142, may be limited. However, secret or other critical information used by SPU 100 can be stored in external memory 105, provided that it is protected (where appropriate) by cryptographic protection process 520 to ensure secrecy (by encryption) and/or integrity (by message integrity codes, cryptographic checksums, digital signatures, or the like). As indicated previously, external memory 105 may, for example, consist of non-volatile RAM (e.g., flash memory, ferroelectric RAM, EEPROM, battery-backed SRAM or DRAM), rotating mass media, or other read-write storage. As long as SPU 100 contains the necessary keys to decrypt and/or validate such externally stored information, external memory 105 can be viewed as an extension of protected internal memory for long-term storage purposes.

Loader 206 is preferably available when SPU 100 is reset (e.g., after a power-on, a resume operation from a power-down mode, or a user-initiated reset), and thus loader 206 should be stored in secure read-only memory 141 or secure non-volatile memory 142.

If loader 206 is stored in secure read-only memory 141, it will preferably not contain secret information, since that information might be accessible to other software that is executed before initializer 205 has run (for example, if SPU 100 includes test or compatibility modes that allow such software to be run). Storing loader 206 or other software modules in internal ROM 141 has the advantage of consuming much less silicon area than would be the case if internal non-volatile memory 142 were used, since ROM cells are typically significantly smaller than RAM cells. This reduces the overall cost of SPU 100 and makes more internal non-volatile memory 142 available for other purposes. Even so, a small amount of internal non-volatile memory 142 is preferably used to store secret values on which loader 206 or other software modules stored in ROM 141 are dependent (e.g., to use such secret values for cryptographic validation of other components being loaded). A disadvantage of storing software modules in internal ROM 141 is that the modules generally cannot be easily modified, repaired, patched, or superseded in the field, except in ways that involve taking the changed modules/functions out of internal ROM 141 and moving them to internal non-volatile memory 142.

Referring once again to FIG. 11, in a preferred embodiment SPU 100 holds, in internal memory 102 or equivalent registers, at least one secret key 502 that is unique to each instance of SPU 100 and not generally known to other parties. Secret key 502 may be generated inside SPU 100 by initializer software 205, or may be generated by factory software 204 and delivered to SPU 100. Because SPU 100 may need different keys for different purposes, it may contain multiple distinct secret keys 502$a$-502$z$, or it may generate other secret keys 502$a$-502$z$ by a fixed cryptographic transform of base secret key 502 (e.g., a transform such as a hash function or a pseudo-random sequence generator). Alternatively, or in addition, SPU 100 may generate plural secret keys 502$a$-502$z$ as required, and store them in external memory 105 under the protection of base secret key 502 as protected representations 512$a$-512$z$.

In addition to secret key 502, in one embodiment SPU 100 has a publicly available (non-secret) device ID value 503 that is different for each instance of SPU 100. Device ID 503 may be stored in protected internal memory 102 and/or may be stored in external memory 105 under the protection (for integrity purposes) of some secret key 502$x$ as protected representation 513.

It is also desirable for SPU 100 to have at least one asymmetric key pair consisting of private key 505$a$ and public key 505$b$ that are unique to each SPU instance. Asymmetric keys 505$a$ and 505$b$ may be stored in protected internal memory 102 and/or in external memory 105 under the protection of some secret key 502$x$ as protected representations 515$a$ and 515$b$.

As shown in FIG. 11, it is desirable for SPU 100 to have at least one cryptographic certificate 506 attesting to the binding of device ID 503 and public key 505$b$. Such a certificate will typically include a signature 507 produced by a signing authority, and a corresponding signing authority ID 508. Certificate 506 may be stored in protected internal memory 102 and/or in external memory 105 under the protection of some secret key 502$x$ as protected representation 516.

In addition, SPU 100 may contain one or more validation keys 509, used to validate digital signatures and/or message authentication codes of data supplied externally. If validation key 509 is an asymmetric key, SPU 100 need only have the public (validation) part of the key pair. Validation keys 509 may be part of a conventional certificate-based digital signature authentication scheme, in which case SPU 100 would generally need direct access only to the root key or keys of each certificate hierarchy.

5.2.2. Permanent Memory Contents

Some information may be permanently stored in internal read-only memory 141 of SPU 100, and established as part of the manufacturing process. In a preferred embodiment, only information whose secrecy is generally unimportant to system security is initialized in this manner. Such information may include device ID 503, public key 505b, certificate 506, and/or validation keys 509. As previously indicated, such information may also include software such as loader 206, and software components such as runtime libraries.

5.2.3. Factory Software Operation

As previously described in connection with FIG. 16, factory software 204 may deliver information to, and receive information from, SPU 100 by direct memory access over external bus 104, by communication with initializer 205, by access through factory test facilities, and/or by other appropriate means. For example, in one embodiment factory software 204 digitally signs monitor 203 and/or other software modules, such that SPU 100 can validate monitor 203 and/or these other software modules using a validation key 509 (which may also be generated and supplied by factory software 204). Similarly, factory software 204 may generate secret key 502 and/or public/private keys 505b and 505a, and deliver them to SPU 100; however, in a preferred embodiment these keys are generated inside SPU 100 (e.g., by initializer software 205), and public key 505b is then delivered from SPU 100 to factory software 204 for generation of certificate 506, certificate 506 then being sent back from factory software 204 to SPU 100. Factory software 204 may also generate device ID 503 and deliver it to SPU 100, factory software 204 keeping a record of all assigned device IDs 503 for tracking purposes and to avoid duplicates. In addition, factory software 204 may set the value of real-time clock 120, and may load initializer software 205, loader software 206, and/or other software modules into internal memory 102.

5.2.4. Initializer Software Operation

In a preferred embodiment, before creating or receiving secret information inside SPU 100, initializer software 205 sets secure flag 501 and other appropriate processor security registers (e.g., erasure control register 402) to indicate that arbitrary software may access internal memory 102 only as appropriate. Initializer 205 may also initialize various internal values in processor 101, memory management unit 131, and processor security registers 132 in order to establish secure operation.

Initializer software 205 may also perform a variety of other functions. For example, initializer software 205 may be responsible for, e.g., storing critical data in internal memory 102 and/or applying cryptographic protection 520 to data and storing these protected data in external memory 105. Initializer 205 also preferably generates secret key 502 and stores it internally, and generates additional secret keys 502a-502z as required. (As indicated above, initializer 205 may alternatively receive key 502 and/or other keys 505a, 505b, 509 from factory software 204). Initializer software 205 also preferably generates public and private keys 505b and 505a, and delivers public key 505b to factory software 204 for generation of certificate 506. Initializer software 205 may also receive device ID 503 from factory software 204, and may receive the current time from factory software 204 and set the value of real-time clock 120. Initializer software 205 may load loader software 206, monitor software 203, and/or other software modules into internal non-volatile memory 142. Alternatively, or in addition, initializer software 205 may store monitor software 203 and/or other software modules in external memory 105 using cryptographic protection software/hardware 520. In other embodiments the initially loaded software may encompass both the functions of initializer software 205 and loader software 206. Once secure initialization has been completed, initializer software 205 may delete itself from internal memory 102 to make space available for other uses.

5.2.5. Loader Software Operation

As described above, loader software 206 is preferably operable to load software modules into SPU 100 over external bus 104. The software modules may, for example, be supplied by factory software 204 or by access to external memory 105. Loader software 206 may also decrypt such modules using an internal key 502 or a key delivered with the module, the delivered key being, e.g., encrypted using public key 505b and recoverable using private key 505a. Similarly, loader software 206 may also, or alternatively, validate message authentication codes on incoming modules using an internal key 502 or keys delivered with the modules (and encrypted using, e.g., public key 505b). Likewise, loader software 206 may validate digital signatures on incoming software modules using validation keys 509 or keys carried in certificates that can ultimately be validated with such validation keys. In addition, loader software 206 may automatically reload and validate certain software modules—such as monitor 203—when tampering is detected or when a reset operation is performed.

5.2.6. Alternative Runtime Loader Operation

In the SPU manufacturing and initialization process, it will generally be desirable to maintain an unbroken chain of custody over the SPU 100 from the time it is manufactured until the time it contains its unique internal key(s) 502, which are stored in battery-backed internal memory 142 and are not visible outside the device. Such a manufacturing and initialization process may also initialize unique device ID 503, certificate 506, and other unique values.

If an unbroken chain of custody is maintained, a fraudulent device cannot be easily substituted for SPU 100 until after the internal secrets are initialized, at which point a fraudulent device would typically be unable to impersonate a real device effectively, since it would not obtain the secret values held in the internal memory of the real device. Such an unbroken chain of custody can be costly, however, as it will typically require the manufacturing process to guarantee battery or other power to SPU 100 indefinitely, beginning at a point before the SPU leaves the trusted factory. This can be particularly inconvenient when SPU 100 is manufactured as a commodity part for installation into arbitrary appliances. Another problem is that SPU 100, if securely initialized by a trusted facility but manufactured as a commodity part, will typically have no external memory in which to store cryptographically protected data. Thus, it would be less costly overall if SPU 100 could be initialized in the field, after it has been installed in an information appliance.

A drawback with field initialization, however, is that fraudulent devices could be substituted during the initialization process, thus enabling the creation of clone devices, the uncontrolled release of internal keys, or other undesirable situations. For example, it is possible to use a cryptographic protocol (e.g., station-to-station) to authenticate the device and the initialization agent, and to establish a shared secret for two parties to communicate. At first glance, such a protocol could allow initializer software, resident in internal ROM 141, to load modules securely, generate secrets, and otherwise initialize the variable state kept in internal non-volatile memory 142. This would be very convenient, as the initialization step could be carried out after an appliance has been manufactured, or even once it is in the hands of the end-user. The problem is that such protocols rely on the information stored in the SPU's internal static read-only memory 141. Although it is feasible to protect internal non-volatile memory 142 against extremely sophisticated attacks by, e.g., requiring continuous power and erasing memory 142 at the first hint of tampering, the same is generally not practical for read-only memory 141. Because memory 141 is static, it can be read while SPU 100 is not connected to a power supply and is being subjected to the full armamentarium of sophisticated VLSI analysis and testing tools (e.g., microprobes, e-beam imaging, thermal microscopy, etc.). Thus, it may be unrealistic to expect information inside ROM 141 of SPU 100 to remain secret in the face of a sophisticated, well-funded attack.

Indeed, unless use is made of mechanisms such as the internal ROM restriction mechanism described below in connection with FIGS. 13, 14, and 15, information in internal ROM 141 can often be simply read by untrusted software. Because SPU 100 is defined to act as an ordinary microcontroller when security functions are not enabled, software can be loaded that copies the entire contents of internal ROM 142 to external memory, where it can be used to construct a simulation. Moreover, even if internal ROM 142 is protected from external software use by a ROM restriction mechanism, its contents might still be obtainable by physical means, as described above.

Thus, if an adversary can read the contents of internal ROM 141, and understand the operation of all the parts of SPU 100, he might be able to construct an accurate simulation of SPU 100, which could then not only participate in secure protocols, but could also be requested later to disgorge its secrets (or otherwise behave undesirably). In an end-user field initialization scenario, such an attack could be undetectable. In such a case, the secure chain of custody would end at the factory, and not be re-established.

If the initialization takes place in a secure facility, but after being handled outside a secure chain of custody, the situation is better, but still less secure than factory initialization. In order to mount an attack, an adversary would typically have to construct a modified or substitute version of SPU 100 that is indistinguishable from a genuine SPU (visually or otherwise, for whatever tests the field initialization facility uses), but behaves differently in some malicious way. For example, a genuine SPU 100 could be extracted from its VLSI package, modified by an electron beam writing workstation so that its address decoding logic permits secure internal non-volatile memory 142 to be accessed without restriction, and then placed back in its package (or a new facsimile thereof). Such an SPU might be visually indistinguishable from a genuine SPU, and might successfully complete the initialization protocol, but would be inherently insecure and pose severe risk to the overall system of which it is a part.

Depending on the security requirements of the overall system, an initialization model with an interrupted or terminated chain of custody may represent an acceptable tradeoff between security and cost. The initialization mechanisms described above can be split at a variety of points (particularly, between manufacture and initialization) to implement such a tradeoff.

5.2.7. Alternative Unique Device Initialization

In addition to the process described in connection with FIGS. 16 and 17, it is possible to fabricate SPU 100 to include internal ROM 141 that is one-time programmable, erasable, flash, or other non-volatile memory that does not require battery power. In such implementations, internal ROM 141 can be initialized securely with unique values at the factory, and SPU 100 can then be distributed without power and the attendant costs and inconveniences of maintaining continuous power. It is also possible to use laser programming or other techniques to modify specific memory cells in each SPU, as part of the final manufacturing process, to achieve the same uniqueness.

This per-device uniqueness (established during manufacturing) substantially reduces the cost of post-manufacturing custody, but introduces the risk that specific instances of SPU 100 can be duplicated and/or simulated, posing a similar overall risk to system security as that described above. The risk differs with per-device uniqueness in that only a specific instance (or instances) of SPU 100 can be compromised, as opposed to all instances (which would be true if the secret information were the same for all manufactured components). If devices have unique IDs established in non-powered memory during manufacture, it is not necessary to load such IDs during a subsequent personalization process.

In a preferred embodiment, the unique values placed in SPU 100 by these steps are both secret and difficult to forge. A small sequential serial number is generally not helpful, because it is neither secret nor hard to guess. Thus, sparse space or other suitable encoding techniques are preferably used.

EEPROM and flash memory, in particular, are more difficult to read out by physical analysis techniques, and thus a combination of such uniqueness and protection against reading by unauthorized software may be an effective tradeoff between manufacturing cost and security in many situations. However, the additional VLSI manufacturing process steps that are typically needed to fabricate such memories, and/or the post-manufacturing laser personalization step, can add considerably to the SPU's fabrication cost.

Figure 18A:
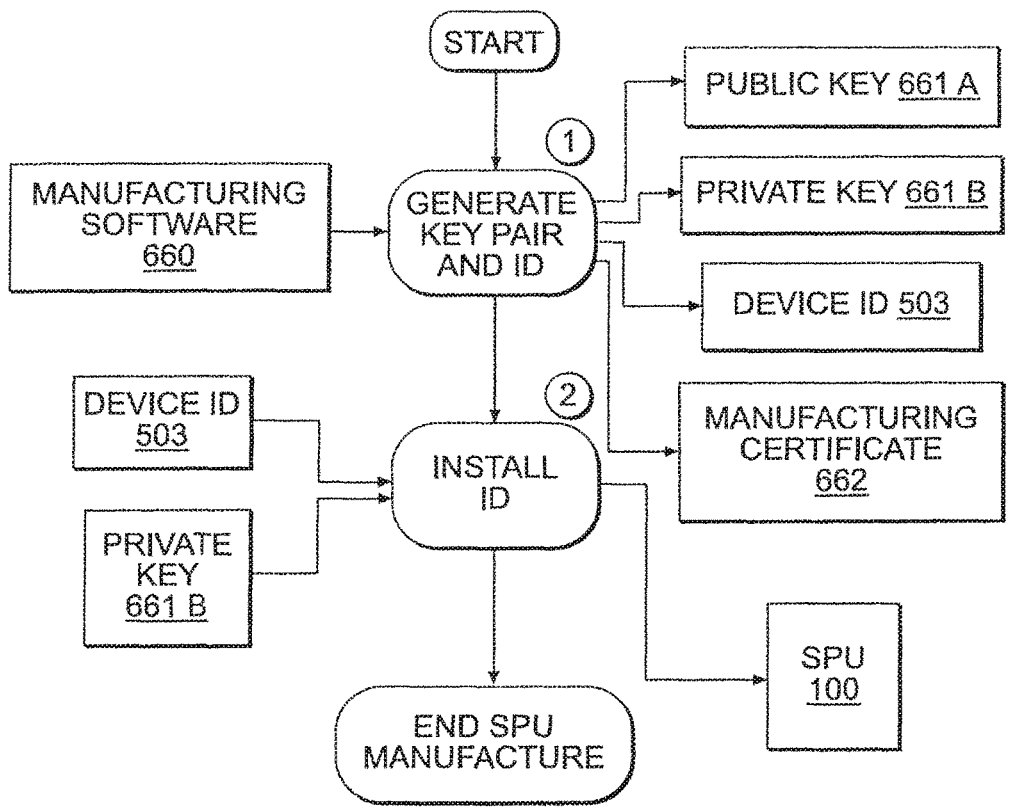
FIG. 18A shows one possible embodiment of initialization based on secure device personalization functions at the SPU manufacturer.
Figure 18B:
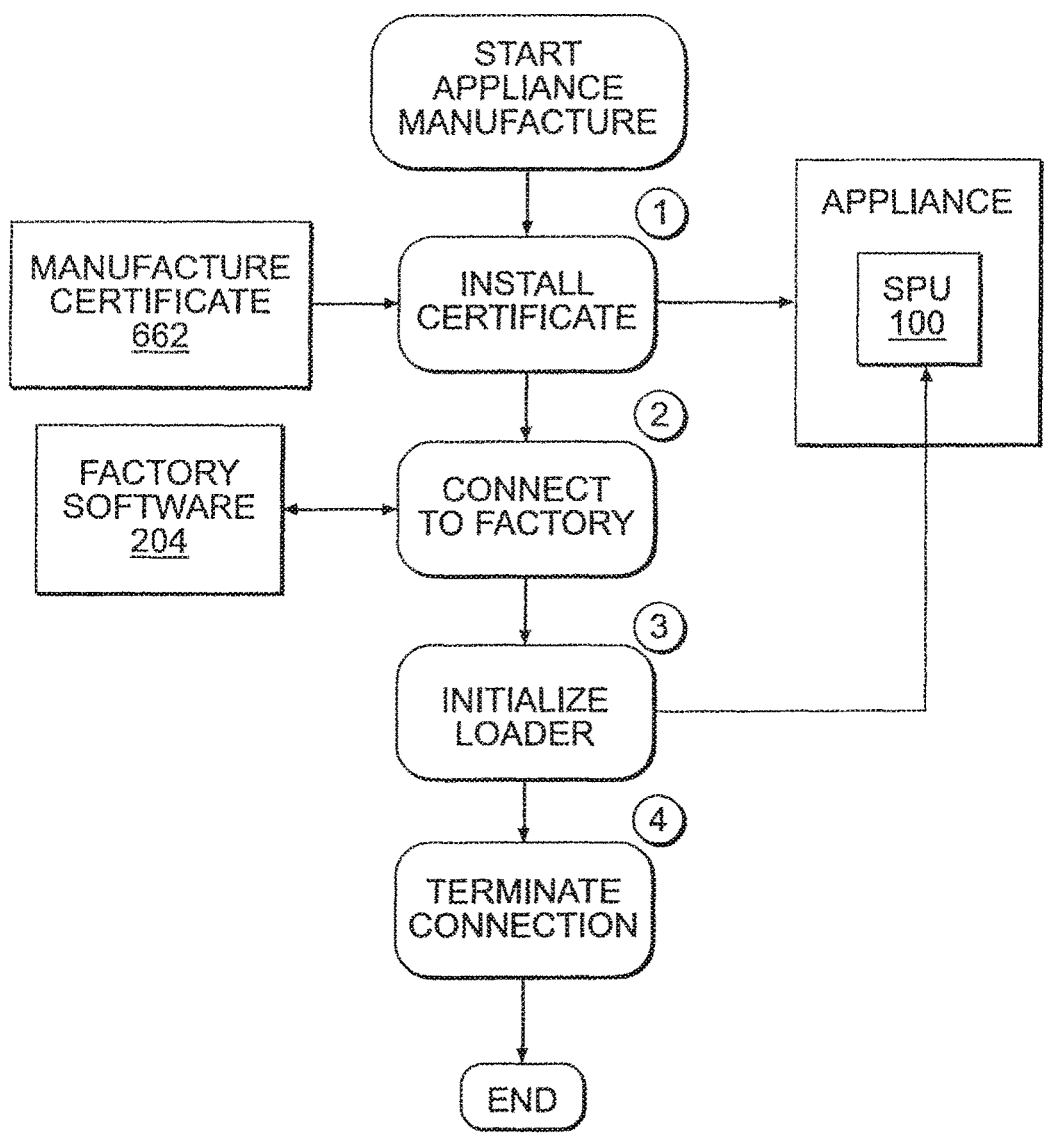
FIG. 18B shows one possible embodiment of initialization based on secure device personalization functions at the appliance manufacturer and the end-user.

FIGS. 18A and 18B illustrates the process of manufacturing and initializing an SPU 100 in accordance with an embodiment of the present invention. Referring to FIG. 18A, manufacturing software 660 generates a unique public/private key pair 661A/661B for the particular SPU 100 being manufactured, along with a device ID 503, and generates manufacturing certificate 662 to establish the binding between ID 503 and public key 661A (block 1 of FIG. 18A). Unique private signing key 661B and device ID 503 are installed in a region of restricted ROM 648 that is accessible only to authorized programs (block 2 of FIG. 18A), and the manufacturing process is concluded.

SPU 100 is then delivered (possibly in an insecure manner) to an appliance manufacturer, along with manufacturing certificate 662 (in some machine-readable form), and SPU 100 is installed in an information appliance such as a music player, personal computer, set-top box, handheld computing device, or the like. As shown in FIG. 18B, manufacturing certificate 662 is installed in the insecure non-volatile external memory 105 of the appliance (block 1). The appliance is then delivered to the end-user (typically in an insecure manner), at which point it is connected (e.g., by the Internet) to factory initialization agent software 204 (block 2 of FIG.

18B). Factory software 204 delivers initialization software 205 and corresponding proof of authorization 520 (e.g., an indication of permission digitally signed by the factory) to the appliance. Proof 520 grants access to a region of restricted ROM 648 containing the factory secret. This process, and other initialization activities, are represented by block 3 of FIG. 18B, and are shown in detail in FIGS. 16 and 17.

As shown in FIG. 18B, the appliance then instructs SPU 100 to run initialization software 205. SPU 100 validates software 205 using validation process 632 and begins executing it (if successful). Initialization software 205 obtains signing key 661B from a region in restricted ROM 648 and uses a security protocol (e.g., a station-to-station protocol employing Diffie-Hellman key agreement and digital signatures) to establish a secure channel with factory software 204.

Factory software 204 and initialization software 205 perform initialization steps such as generating secret key(s) 502, storing loader software 206, monitor 203, or other software into SPU 100's non-volatile internal memory 142, and performing other initialization steps as described above. Initialization software 205 may also store cryptographically protected data in external memory 105 as previously described. Finally, the appliance terminates the secure channel with factory software 204 (block 4 of FIG. 18B).

At this point, SPU 100 is initialized in the same manner as if it had been initialized at the manufacturing factory. The risk in this approach is that an adversary can create clones of SPU 100 that disclose secrets or otherwise misbehave. However, exploiting this vulnerability will typically require physical analysis, not merely a software attack, because of the internal ROM protection employed in block 2. Moreover, only a single SPU's secrets would be disclosed if one such attack were successful, since creating a fraudulent SPU with a different device ID 503 would necessitate the generation of a corresponding certificate 662, which could be done only with the signing keys held by the secure manufacturing software 660.

It should be appreciated that while the process outlined here introduces a separate manufacturing certificate 662 and signing key 661B, distinct from device key(s) 502, that separation is not a requirement, although it does improve the overall security of the system by ensuring that the specific device keys are only stored and generated once the devices have been initialized by interaction with an on-line service (e.g., factory initialization agent software 204). Moreover, such a service can engage in other activities (e.g., information collection) that further deter or reduce fraud, such as monitoring patterns of activity or transactions for suspicious indicators.

6. Restricting Access to Internal ROM Functions

In order to satisfy export requirements that limit access to cryptographic functions, to restrict access to software implementing valuable trade secrets, to support a relatively secure field initialization function, and/or to control software use for other reasons, an SPU can provide implementations of protected, critical, restricted, or controlled functions wherein a caller must demonstrate authorization before the protected functions can be executed successfully. If the authorization is not demonstrated, the calling software's attempt to invoke the protected functions will fail.

To perform such validation securely inside SPU 100, the validation function should be performed in a manner that prevents it from being interfered with, or simulated by, unauthorized software running on SPU 100, including software that has access to other parts of the secure state. For this reason, in a preferred embodiment a hardware-assisted mechanism is used.

Figure 13:
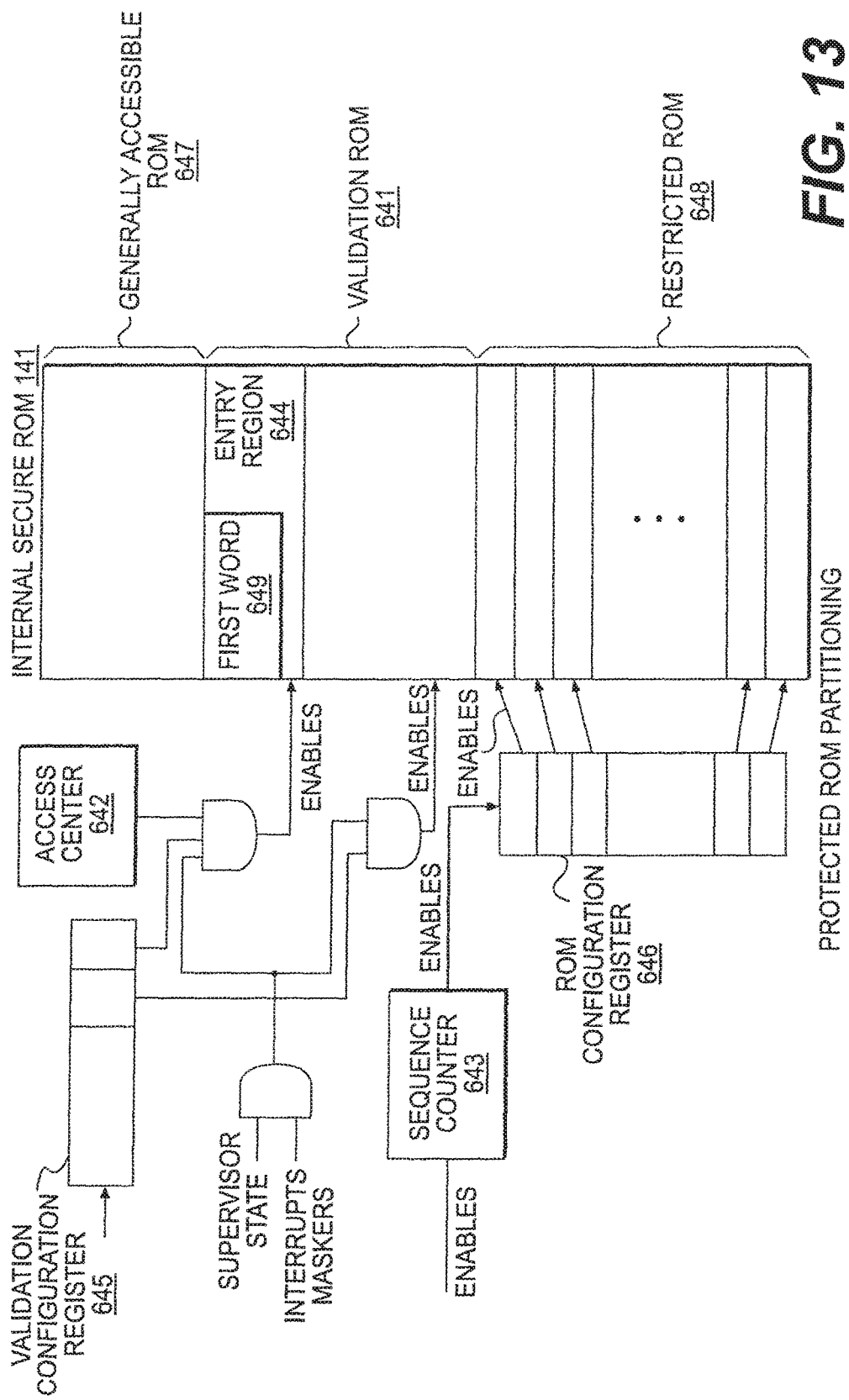
FIG. 13 shows hardware structures used to restrict access to software modules stored in internal ROM.

As shown in FIG. 13, in one embodiment internal secure ROM 141 can be divided into three areas:

1. Generally accessible ROM 647, which is always accessible to CPU instructions.
2. Restricted ROM 648, which is accessible to CPU instructions only when specifically enabled by configuration register 645.
3. Validation ROM 641, which is accessible to CPU instructions only when performing access validation checks, and which is controlled by configuration register 645 and counters 642 and 643.

Division of internal ROM 141 into these areas (and the corresponding mappings to control registers) is preferably a fixed process, determined at the time the chip is fabricated; because the contents of the ROM are unchangeable, there will generally not be a reason to make the configuration changeable.

6.1. Validation Data

Figure 14:
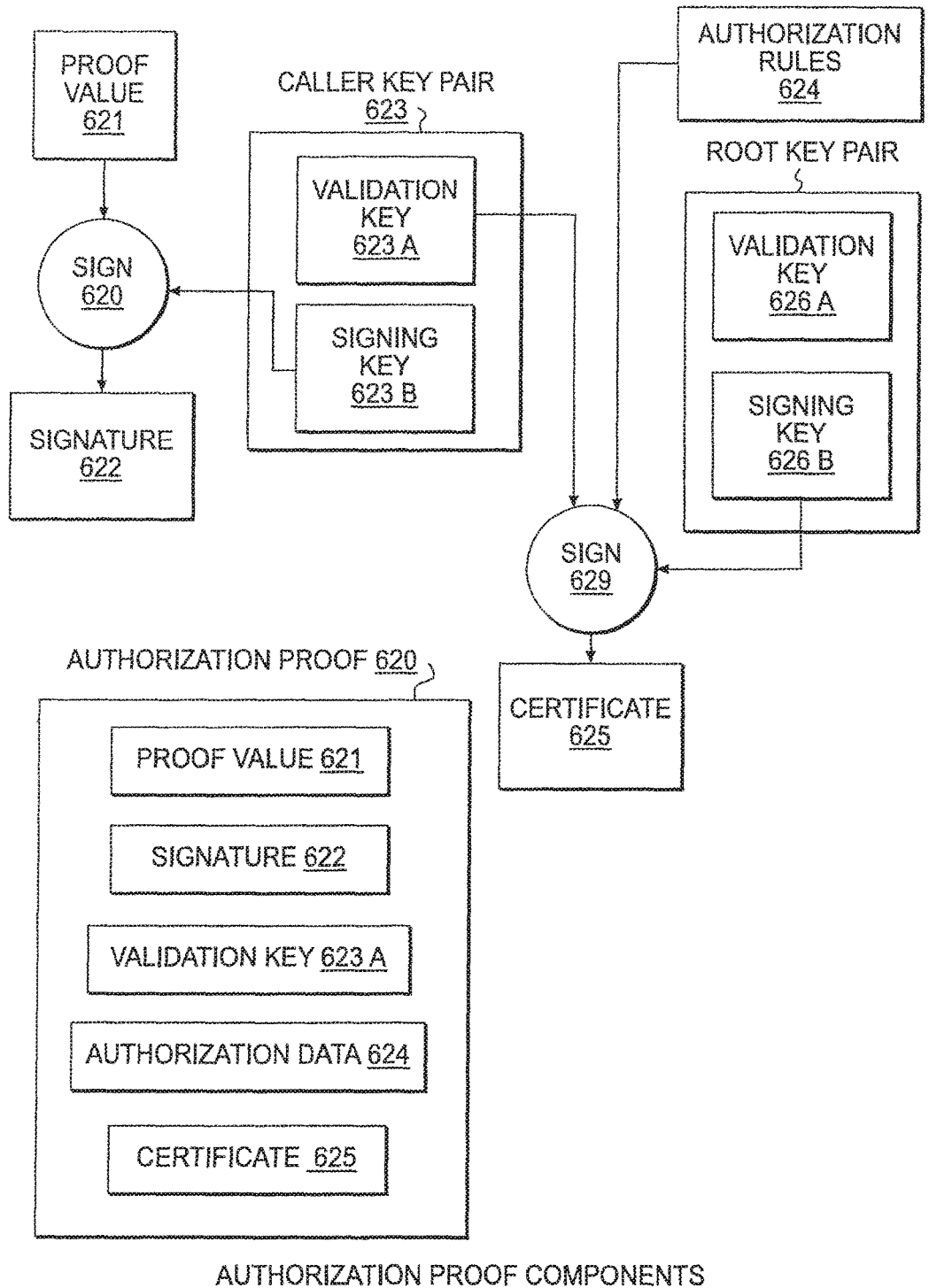
FIG. 14 shows components of the authorization data used to grant access to restricted internal ROM modules.

One technique for demonstrating authorization is for calling software 631 to present a proof of authorization 620 consisting of the following components, as shown in FIG. 14:

Proof value 621
Digital signature 622 for proof value 621
Caller validation key 623A used to validate signature 622
Authorization rules 624 describing the permitted operations
Certificate 625 comprising a digital signature that binds together public key 623A and rules 624, and is signed by root signature key 626B.

In a preferred embodiment, root validation key 626A, the public half of an asymmetric key pair also including root signature key 626B, is embedded in the validation software. Root signature key 626*b* is preferably held only at the secure location of the validation authority. There may be one root key pair 626 that is common to all instances of SPU 100, or there may be several used in various sets of SPU instances. Different root key pairs 626 may use different algorithms, and may be used in parallel such that the multiple certificates 625 must be validated using multiple validation keys 626A. Diversity of keys and/or algorithms reduces risk in the event any particular key and/or algorithm is compromised.

Caller validation key 623A and its counterpart, caller signature key 623B, are typically unique to a particular instance, issuer, or owner of calling software 631. Similarly to root keys 626, plural keys and/or algorithms may be employed.

Validation of signature 622 is used to determine the caller's subsequent authorization for operations. FIG. 15 shows one possible embodiment for validation process 632. As shown in FIG. 15, calling software 631 stores components of proof 620 in certain hardware registers (blocks 1-3), then issues a command (e.g., a CPU instruction or reference to a control register) requesting validation hardware or software to analyze the supplied proof 620 and to set access accordingly (blocks 4-5). Because the validation process for a digital signature is relatively complex, it will typically be more practical to implement it in software rather than in hardware, although it will be appreciated that any suitable implementation could be used.

It will be understood that signing process 629 and its corresponding validation process may involve both digital signatures and cryptographic hashing, as well as other cryptographic techniques appropriate to an asymmetric twokey authentication process. In a preferred embodiment an asymmetric process is used to ensure that an adversary cannot readily forge new values of authorization data 624.

Proof value 621 may be randomly generated by calling software 631, may be constant and embedded in calling software 631, or may be generated by validation process software 633 (or some related component) to be signed by calling software 631. It may also be derived from a checksum (or cryptographic hash) of calling software 631. In cases where proof value 621 is not dynamically generated, it is not necessary for calling software 631 to contain signing key 623*b*, which effectively prevents an adversary who obtains software 631 from forging signature 622.

6.2. Validation Process Overview

In a preferred embodiment validation process 632 is performed using software executing on the main CPU, with hardware assistance to protect the validation mechanism (e.g., performed by validation process software 633) as it is operating. While an illustrative embodiment described herein is based on the ARM7 processor architecture, it will be appreciated that most other processor architectures are readily amenable to a similar implementation.

Figure 15:
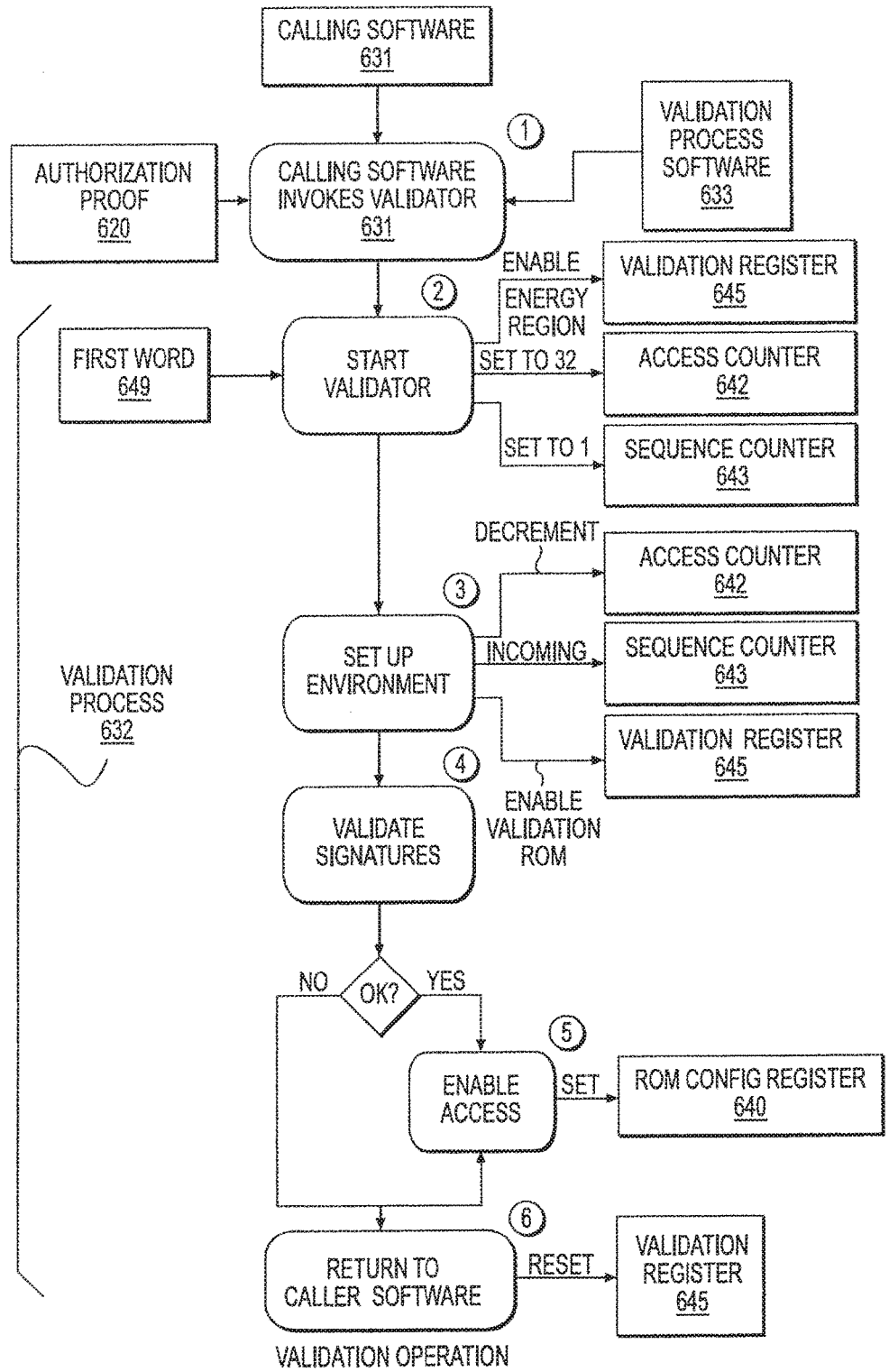
FIG. 15 shows the steps performed in the authorization process for granting access to restricted internal ROM modules.

A more detailed description of validation process 632 will now be provided with reference to FIG. 15. Referring to FIG. 15, calling software 631 transfers control to the first word 649 of validation process software 633 (in validation ROM region 641), which is initially the only accessible location in region 641 (block 1 of FIG. 15). As shown in FIGS. 13 and 15, the hardware makes a small additional entry region 644 of region 641 accessible, and the instructions in that region disable cache and otherwise initialize the environment to be immune to external interference (block 2 of FIG. 15). After initializing the environment, software 633 changes validation register 645 to enable unconstrained access to all of region 641 (block 3 of FIG. 15).

Next, validation process 632 is performed to validate the digital signatures in proof 620 (block 4 of FIG. 15). If the signatures are valid, the results are applied to other ROM configuration registers 646 as appropriate (block 5 of FIG. 15). Finally, validation register 645 is reset to restore access controls to ROM region 641 to their default state (block 6 of FIG. 15).

Thus, the process described above effectively prevents use of validation process software 633 except for the purpose of validating authorizations (which is advantageous since it is a cryptographic mechanism and potentially subject to export controls). This process can be implemented entirely in logic in SPU 100 that manages internal secure ROM 141, without change to or effect on processor 101 or other internal components. A similar approach could also be implemented more directly under CPU control, although such an approach may complicate the design somewhat and make it more difficult to provide assurance of correct implementation.

6.3. Operation of Validation Process

In a preferred embodiment, executable code (that is, validation process software 633) for validation process 632 resides in validation ROM region 641 in internal secure read-only memory 141. Region 641 can respond to accesses in various ways, controlled by validation configuration register 645 and counters 642 and 643, as illustrated in FIG. 13. In its default state, region 641 is configured so that it is accessible only if the following conditions apply:

Processor 101 is operating in supervisor state.
Processor 101 is not accepting interrupts.
The access to validation ROM region 641 is an instruction fetch of first word 649 in the region.

If these conditions do not apply, accesses to region 641 fail (e.g., by returning zeros or signaling an exception).

When this initial state is detected (i.e., when an instruction is fetched from the first word of region 641), access counter 642 is initialized to a fixed value (e.g., 20), sequence counter 643 is initialized to one, and the configuration for region 641 is changed automatically so that the following rules apply:

Processor 101 is operating in supervisor state.
Processor 101 is not accepting interrupts.
All accesses to ROM region 641 are instruction fetches in entry region 644 (which represents a fixed-size region at the beginning of region 641, such as 16 words).
Access counter 642 is non-zero.
Each access to region 641 decrements access counter 642. Access counter 642 stops decrementing when it reaches zero. If counter 642 reaches zero in this state, access to validation ROM region 641 is reset to the default state.
Each instruction fetch from region 641 increments sequence counter 643. Sequence counter 643 stops incrementing when it reaches a fixed value (e.g., 8). Instruction fetches to memory outside region 641 reset sequence counter 643 to zero.

A third state for region 641 can be established by explicitly setting validation register 645. This state permits access if the following conditions apply:

Processor 101 is operating in supervisor state.
Processor 101 is not accepting interrupts.
Accesses for data or instructions are made to any location in validation ROM region 641.

Once in this state, access counter 642 is no longer updated and does not affect memory access. The purpose of counter 642 is to ensure that this state is established promptly, and to guard against errors that might cause it to be entered invalidly.

Writes to validation registers 645 and ROM configuration register 646 that grant access are preferably permitted only when sequence counter 643 is at its maximum value, indicating that a sequence of that many instructions has been sequentially fetched from within region 641 and thus that the entry into the protected operating mode has completed successfully. In this manner, sequence counter 643 ensures that the appropriate validation process software 633 is manipulating the authorization mechanisms.

In one preferred embodiment, validation software 633 starts by disabling cache so that all subsequent instruction fetches take place explicitly over internal bus 109. This permits access counter 642 and sequence counter 643 to keep track of such accesses. Software 633 may also force other processor states to known values in order to prevent interference; it does not, however, need to disable memory management unit 131, since all of region 641 is either defined to be in a single page, or is forced to be in a sequence of correctly mapped pages (a test that can be performed by instructions in the first page).

In an alternative embodiment, entry code in region 644 could also be responsible for ensuring that processor 101 is in supervisor state and/or has interrupts disabled. Similarly, a hardware mechanism could enforce disabling cache and other state changes. These embodiments may be chosen based on the specific hardware characteristics of processor 100.

Once entry is validated and validation register 645 is initialized to allow all of validation process software 633 to be accessible and to function, the software locates the caller-supplied authorization proof 620 (in caller-owned memory) and validate the digital signature in certificate 625 for validation key 623A, using root key 626A (or keys, as discussed above) embedded in validation process software 633. Validation process software 633 then validates digital signature 622 using validation key 623A. Next, validation process software 633 sets ROM configuration registers 646 in accordance with the authorization rules 624 specified in certificate 625, and sets validation register 645 to restore access controls for ROM region 641 to their default state. Validation process software then returns status and control to the calling software.

Block 5 of FIG. 15 places validation ROM region 641 temporarily into a fourth access control state, such that access is unrestricted, but when sequence counter 643 is reset to zero (by an instruction fetch outside region 641), access restrictions are reset to the default state in which only the first word is accessible. To summarize, access to memory region 641 may be in one of four states:

Default: instruction fetch access is permitted to first word 649 of region 641 only.

Entry: instruction and data fetch is permitted to entry region 644 (e.g., first 16 words).

General: accesses (instruction and data) are permitted throughout all of region 641.

Terminal: accesses are permitted throughout all of region 641 until any instruction fetch occurs outside region 641, at which point access is reset to default state.

6.4. Result of Validation Process

Typically, validation process 632 is intended to enable access to other functions implemented in internal secure ROM 141, by specifying protections that apply to certain regions of physical addresses, specifically those in restricted ROM 648.

In the embodiment shown in FIG. 13, for example, ROM configuration registers 646 control access to physical memory regions in internal ROM 141. For example, each bit in configuration register 646 could enable or disable access to a single small region (e.g., 256 bytes, 1024 bytes, etc.) within restricted ROM 648 according to a fixed map between the ROM addresses and the register bits. Alternatively, multiple bits in configuration register 646 could independently enable access for user, supervisor, or other processor modes. Other implementations of ROM configuration register(s) 646 could control access based on base/bound protections, segmentation, or internal processor registers.

Although the foregoing invention has been described in some detail for purposes of clarity, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A secure processing unit, comprising:
 a processor,
   said processor capable of operating in a plurality of modes, at least one of said modes being a secure mode and at least one of said modes being a normal mode,
   said processor comprising one or more processor security registers,
   a first of said one or more processor security registers arranged to indicate whether or not the processor is operating in a secure mode;
 secure internal memory,
   said secure internal memory being secured by hardware such that it is accessible only by the processor when said first processor security register indicates that the processor is operating in secure mode,
   said secure internal memory being divided into a plurality of regions, at least one of said plurality of regions containing logic for performing a process, and at least one of said plurality of regions being further restricted to accesses by the processor based on the values in a secure memory configuration register;
 a secure memory configuration register;
 logic to ensure that access to a restricted region of secure memory is only permitted when both:
   (i) the first processor security register indicates that the processor is operating in a secure mode, and
   (ii) the secure memory configuration register contains values indicating that the access is permitted; and
 logic to ensure that the processor initializes in a secure state by default.

2. The secure processing unit of claim 1, wherein the region containing logic for performing a process comprises instructions for performing a validation process.

3. The secure processing unit of claim 2, wherein said instructions for performing a validation process includes an embedded validation key.

4. The secure processing unit of claim 1, wherein the restricted region of secure memory comprises instructions for performing a field initialization process.

5. The secure processing unit of claim 1, wherein the region containing logic for performing a process comprises instructions for execution by the processor, and the secure processing unit further includes logic that only permits the processor to begin executing said instructions at a securely configured entry point within the secure memory.

* * * * *